United States Patent
Park et al.

(10) Patent No.: US 11,356,872 B2
(45) Date of Patent: Jun. 7, 2022

(54) RADIO LINK MONITORING METHOD IN WIRELESS COMMUNICATION SYSTEM AND DEVICE THEREFOR

(71) Applicant: LG Electronics Inc., Seoul (KR)

(72) Inventors: Jonghyun Park, Seoul (KR); Kijun Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/545,011

(22) PCT Filed: Jan. 28, 2016

(86) PCT No.: PCT/KR2016/000945
§ 371 (c)(1),
(2) Date: Jul. 20, 2017

(87) PCT Pub. No.: WO2016/122232
PCT Pub. Date: Aug. 4, 2016

(65) Prior Publication Data
US 2018/0007574 A1   Jan. 4, 2018

Related U.S. Application Data

(60) Provisional application No. 62/109,616, filed on Jan. 30, 2015.

(51) Int. Cl.
*H04W 24/08* (2009.01)
*H04W 72/04* (2009.01)
(Continued)

(52) U.S. Cl.
CPC .............. *H04W 24/08* (2013.01); *H04B 7/04* (2013.01); *H04B 17/382* (2015.01); *H04L 5/0048* (2013.01); *H04W 72/042* (2013.01)

(58) Field of Classification Search
None
See application file for complete search history.

(56) References Cited

U.S. PATENT DOCUMENTS 9,585,045 B2 *  2/2017  Lee ................. H04W 36/00837
9,924,419 B2 *  3/2018  Moon .................... H04W 76/38
(Continued)

FOREIGN PATENT DOCUMENTS

GB    2507570 A    5/2014
JP    2014-093659 A    5/2014
(Continued)

OTHER PUBLICATIONS

Sony, "On reference signals from RRM measurements in FD-MIMO" R1-145022, 3GPP TSG RAN WG1 #79, San Francisco, USA, Nov. 8, 2014.
(Continued)

*Primary Examiner* — Khaled M Kassim
*Assistant Examiner* — Berhanu D Belete
(74) *Attorney, Agent, or Firm* — Dentons US LLP

(57) ABSTRACT

Disclosed is a method for radio link monitoring in a wireless communication system and an apparatus for the method. More specifically, a method for a user equipment (UE) to perform Radio Link Monitoring (RLM) in a wireless communication system comprises performing second RLM on a cell based on a Reference Signal (RS) other than a Cell-specific Reference Signal (CRS) and determining an Radio Link Failure (RLF) with respect to the cell based on the second RLM, wherein a condition for determining an RLF applied to the second RLM is different from the condition for determining an RLF applied to CRS-based first RLM.

14 Claims, 15 Drawing Sheets

(51) Int. Cl.
*H04B 17/382* (2015.01)
*H04B 7/04* (2017.01)
*H04L 5/00* (2006.01)

(56) References Cited

U.S. PATENT DOCUMENTS

| | | | | |
|---|---|---|---|---|
| 10,517,102 B2* | 12/2019 | Kazmi | ............... | H04L 5/0048 |
| 2005/0030967 A1* | 2/2005 | Ohmi | ............... | H04W 12/08 |
| | | | | 370/445 |
| 2013/0039268 A1* | 2/2013 | Blankenship | ..... | H04W 56/0015 |
| | | | | 370/328 |
| 2013/0194950 A1* | 8/2013 | Haghighat | ........... | H04W 24/02 |
| | | | | 370/252 |
| 2013/0252606 A1* | 9/2013 | Nimbalker | ........... | H04B 17/309 |
| | | | | 455/434 |
| 2013/0301434 A1* | 11/2013 | Krishnamurthy | ..... | H04L 1/0026 |
| | | | | 370/252 |
| 2014/0043988 A1* | 2/2014 | Chen | ............... | H04L 1/0026 |
| | | | | 370/252 |
| 2014/0643988 | 2/2014 | Chen et al. | | |
| 2014/0086173 A1* | 3/2014 | Sadeghi | ............... | H04L 5/003 |
| | | | | 370/329 |
| 2014/0269368 A1* | 9/2014 | Xu | ............... | H04W 24/00 |
| | | | | 370/252 |
| 2014/0286176 A1* | 9/2014 | Ro | ............... | H04W 24/04 |
| | | | | 370/242 |
| 2015/0063148 A1* | 3/2015 | Sadek | ............... | H04W 52/243 |
| | | | | 370/252 |
| 2015/0071281 A1* | 3/2015 | Shiotani | ............... | H04L 7/0041 |
| | | | | 370/350 |
| 2015/0078335 A1* | 3/2015 | Sivanesan | ......... | H04W 74/0833 |
| | | | | 370/331 |
| 2015/0126206 A1* | 5/2015 | Krishnamurthy | ..... | H04W 76/18 |
| | | | | 455/452.1 |
| 2015/0146562 A1* | 5/2015 | Sivanesan | ............. | H04L 5/0032 |
| | | | | 370/252 |
| 2015/0181479 A1* | 6/2015 | Lin | ............... | H04W 36/0069 |
| | | | | 370/329 |
| 2015/0201343 A1* | 7/2015 | Jung | ............... | H04W 24/10 |
| | | | | 370/252 |
| 2015/0201356 A1* | 7/2015 | Wang | ............... | H04W 74/0833 |
| | | | | 370/331 |
| 2015/0215856 A1* | 7/2015 | Kim | ............... | H04W 24/08 |
| | | | | 370/252 |
| 2015/0257130 A1* | 9/2015 | Lee | ............... | H04L 5/1469 |
| | | | | 370/336 |
| 2015/0271717 A1* | 9/2015 | Moon | ............... | H04W 36/0072 |
| | | | | 455/437 |
| 2015/0327097 A1* | 11/2015 | Chai | ............... | H04W 24/08 |
| | | | | 370/252 |
| 2016/0014646 A1* | 1/2016 | Yiu | ............... | H04W 36/0079 |
| | | | | 370/331 |
| 2016/0037426 A1* | 2/2016 | Li | ............... | H04W 36/0094 |
| | | | | 370/332 |
| 2016/0037428 A1* | 2/2016 | Kanugovi | ............... | H04L 69/16 |
| | | | | 370/329 |
| 2016/0057684 A1* | 2/2016 | Larsson | ............... | H04W 36/26 |
| | | | | 370/331 |
| 2016/0057708 A1* | 2/2016 | Siomina | ............ | H04W 72/1263 |
| | | | | 455/452.2 |
| 2016/0100355 A1* | 4/2016 | Chen | ............... | H04W 72/085 |
| | | | | 370/232 |
| 2016/0112924 A1* | 4/2016 | Turakhia | ............. | H04W 36/305 |
| | | | | 370/332 |
| 2016/0127089 A1* | 5/2016 | Haghighat | ............ | H04L 5/0073 |
| | | | | 370/329 |
| 2016/0212752 A1* | 7/2016 | Xu | ............... | H04L 5/0048 |
| 2016/0219475 A1* | 7/2016 | Kim | ............... | H04W 76/28 |
| 2016/0255518 A1* | 9/2016 | Maeda | ............... | H04W 48/12 |
| | | | | 370/329 |
| 2016/0255580 A1* | 9/2016 | Onaka | ............... | H04W 48/00 |
| | | | | 370/311 |
| 2016/0269952 A1* | 9/2016 | Moon | ............... | H04W 76/18 |
| 2016/0278103 A1* | 9/2016 | Kazmi | ............... | H04W 72/085 |
| 2016/0295462 A1* | 10/2016 | Lunden | ............... | H04W 76/28 |
| 2016/0330680 A1* | 11/2016 | Yi | ............... | H04W 48/20 |
| 2016/0374135 A1* | 12/2016 | Martin | ............... | H04W 76/14 |
| 2017/0013489 A1* | 1/2017 | Seo | ............... | H04L 1/0026 |
| 2017/0164419 A1* | 6/2017 | Kim | ............... | H04W 28/08 |
| 2017/0170941 A1* | 6/2017 | Yang | ............... | H04W 24/10 |
| 2017/0188273 A1* | 6/2017 | Yiu | ............... | H04W 36/04 |
| 2017/0331611 A1* | 11/2017 | Stern-Berkowitz | ....... | H04L 5/14 |
| 2018/0115911 A1* | 4/2018 | Huang | ............... | H04W 48/08 |
| 2018/0279403 A1* | 9/2018 | Kim | ............... | H04W 36/04 |
| 2019/0090219 A1* | 3/2019 | Lee | ............... | H04L 5/0053 |
| 2019/0098520 A1* | 3/2019 | Kim | ............... | H04W 24/04 |
| 2020/0084748 A1* | 3/2020 | Sadeghi | ............... | H04L 5/003 |

FOREIGN PATENT DOCUMENTS

| | | |
|---|---|---|
| WO | 2014/068535 A2 | 5/2014 |
| WO | 2014069382 A1 | 5/2014 |

OTHER PUBLICATIONS

Huawei, HiSilicon, "RRM measurement procedures with DRS," 3GPP TSG RAN WG1 Meeting #77, May 19-23, 2014, R1-141917.

Catt, "Discussions on Small Cell ON-OFF and Discovery Signal," 3GPP TSG-RAN WG2 Meeting #86, May 19-23, 2014, R2-142188.

* cited by examiner

[FIG. 1]
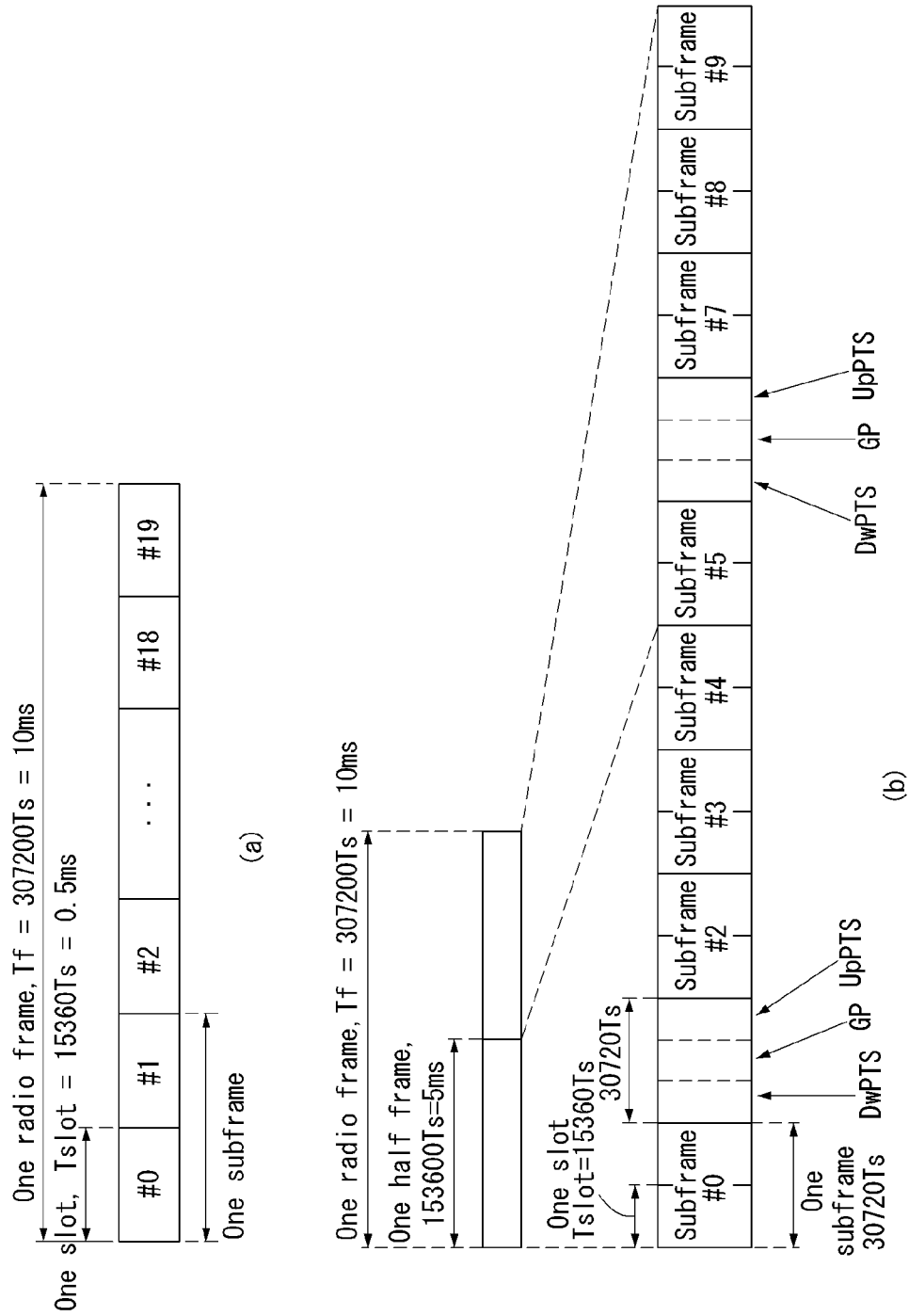

【FIG. 2】
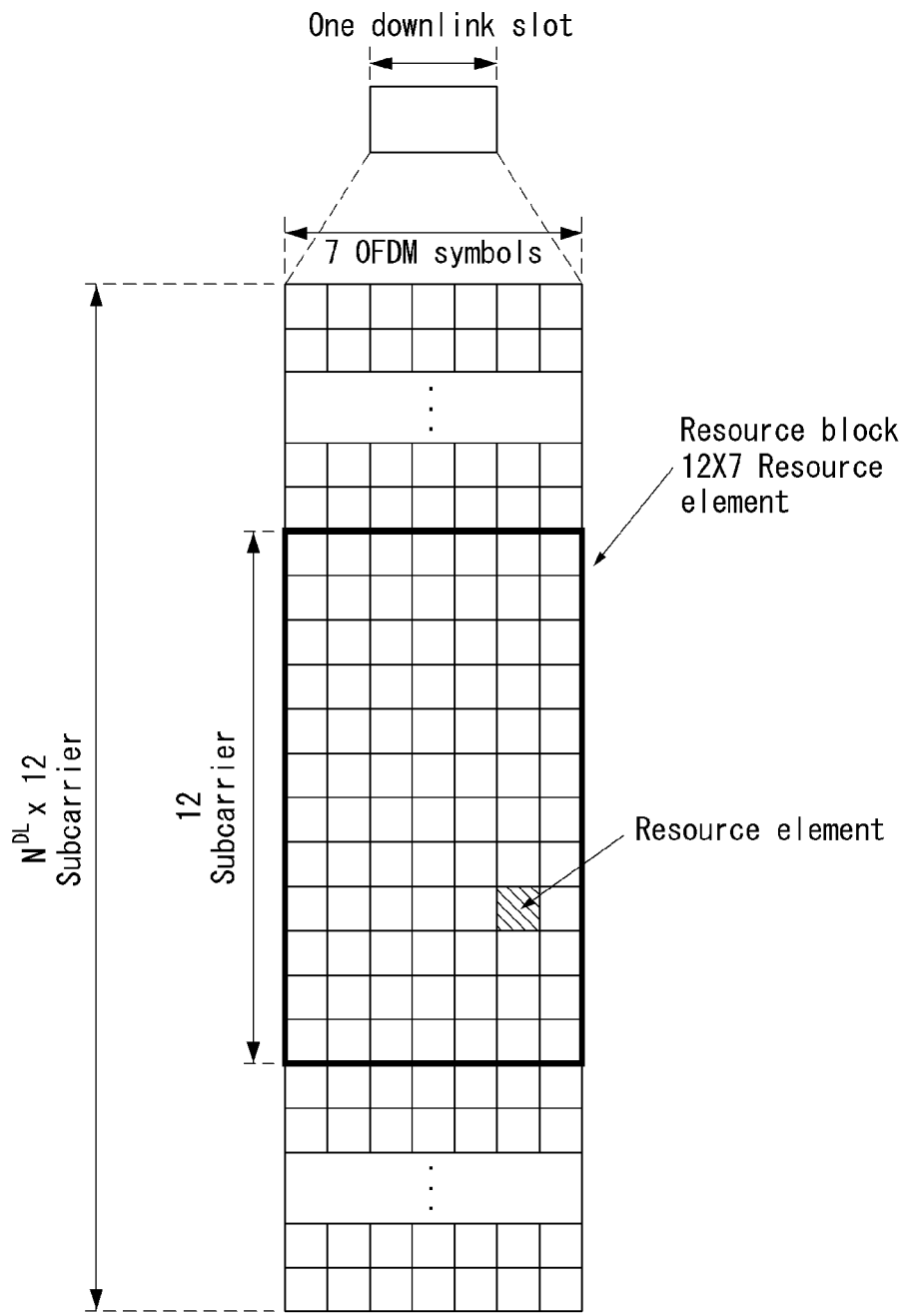

[FIG. 3]
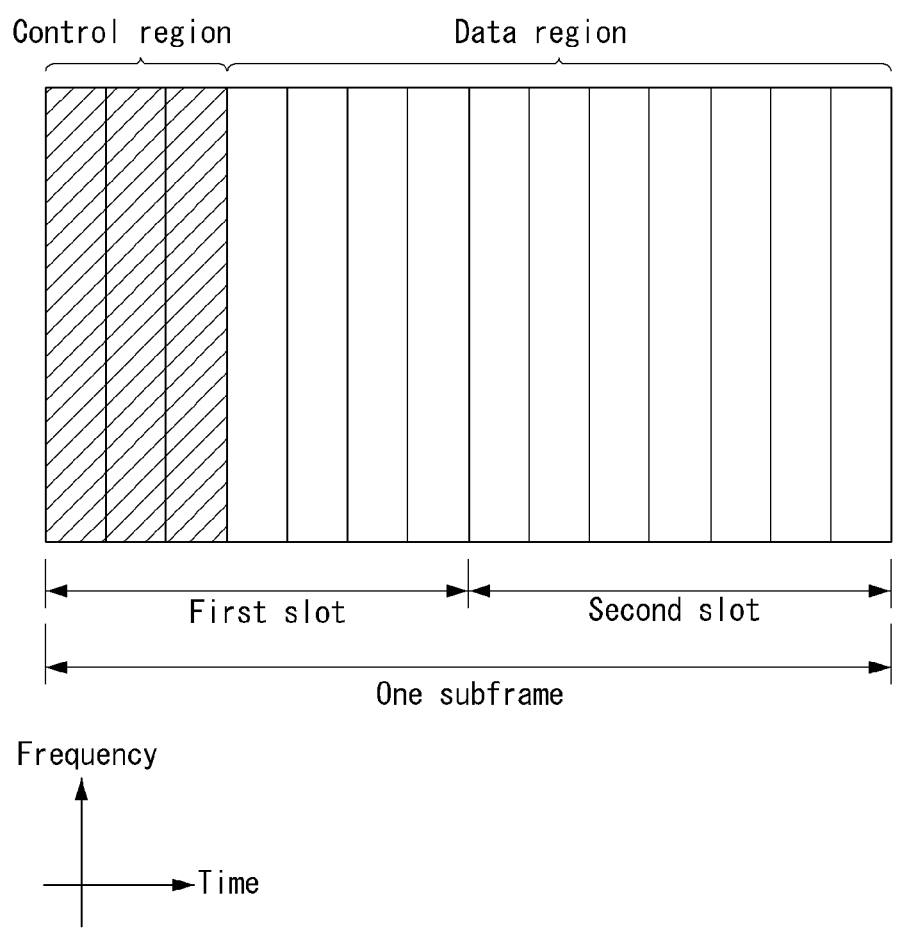

[FIG. 4]
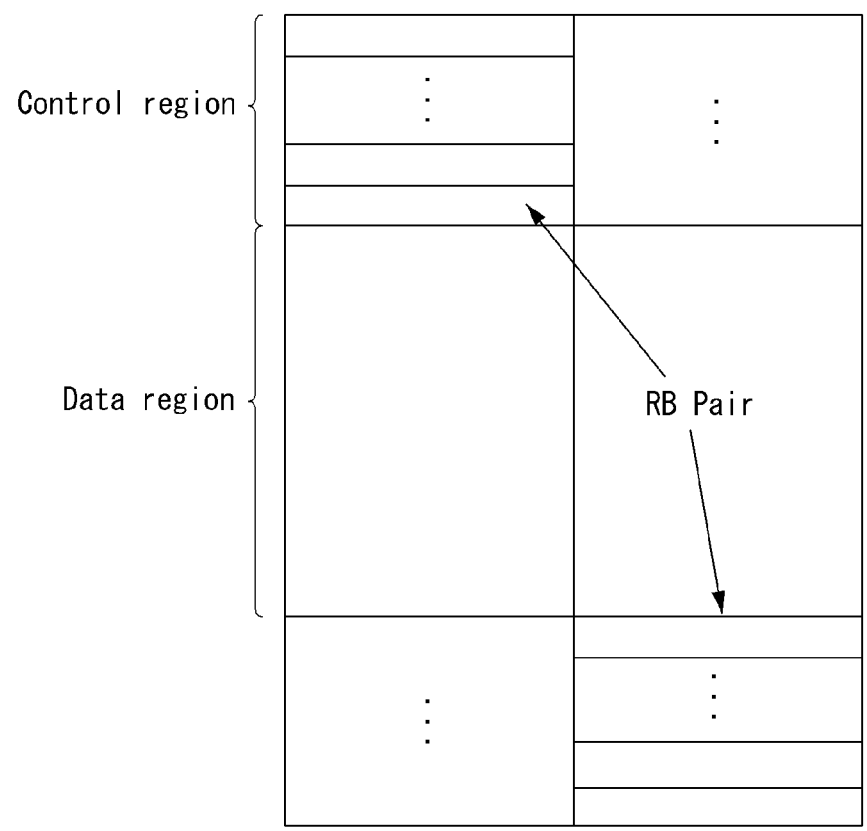
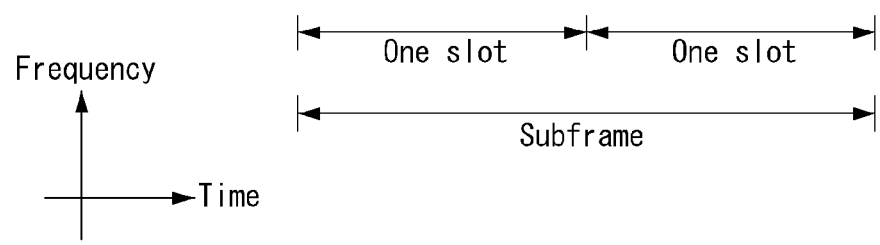

[FIG. 5]
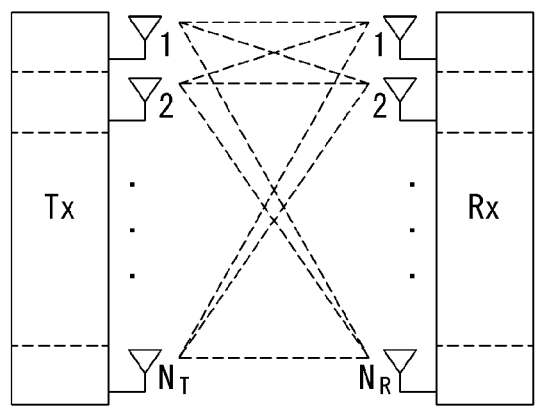
[FIG. 6]
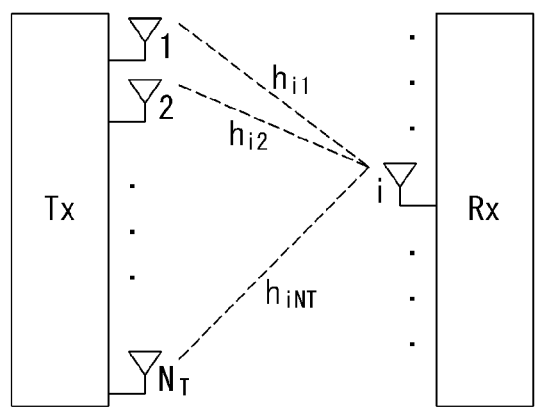

[FIG. 7]
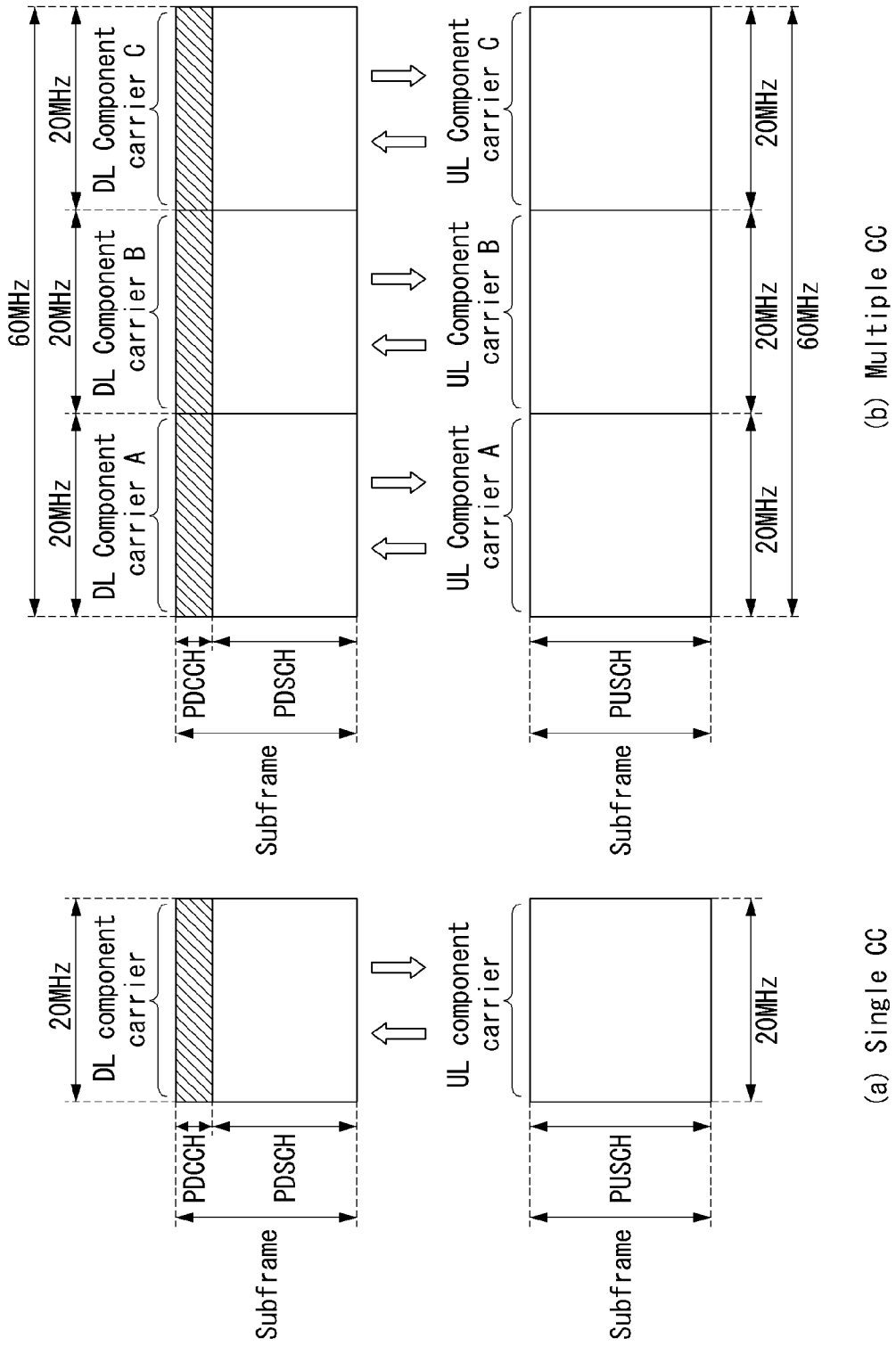

[FIG. 8]
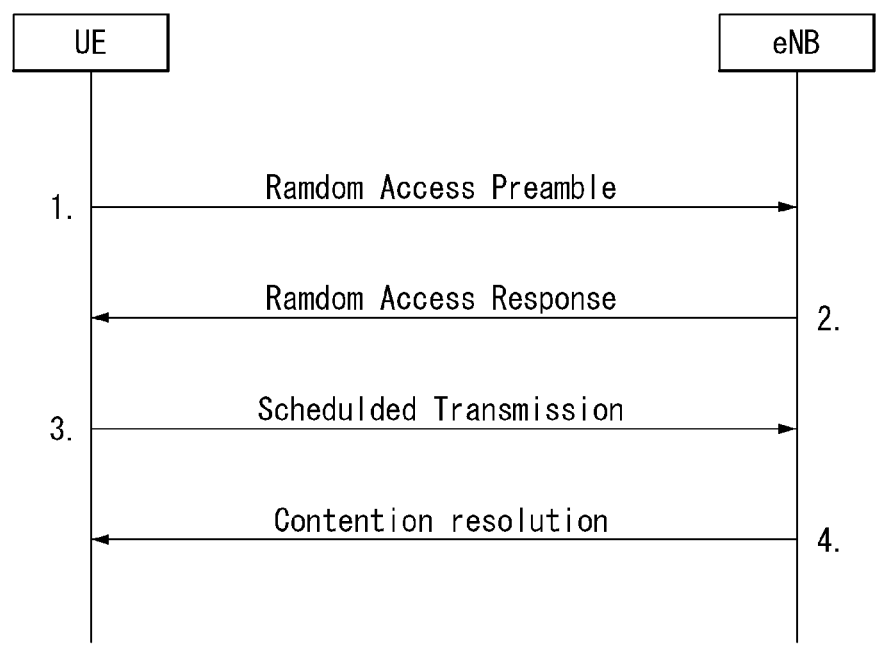

[FIG. 9]
(a) 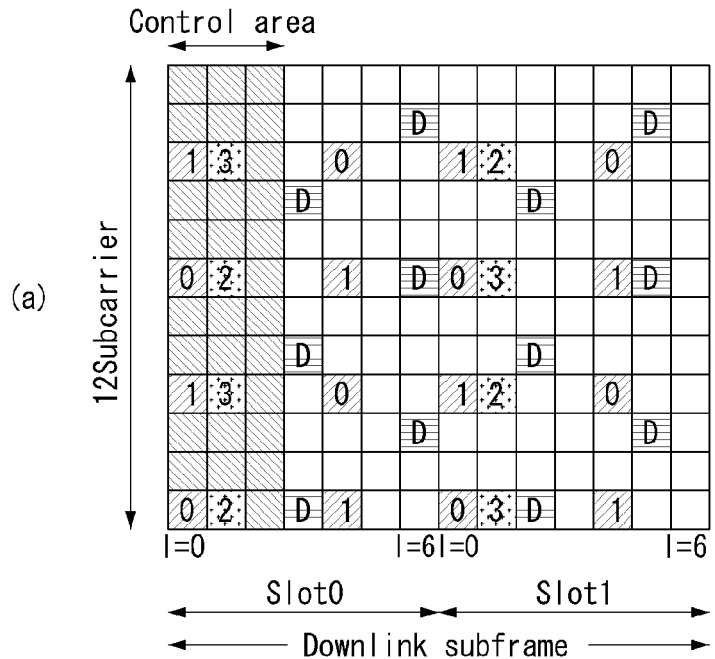
(b) 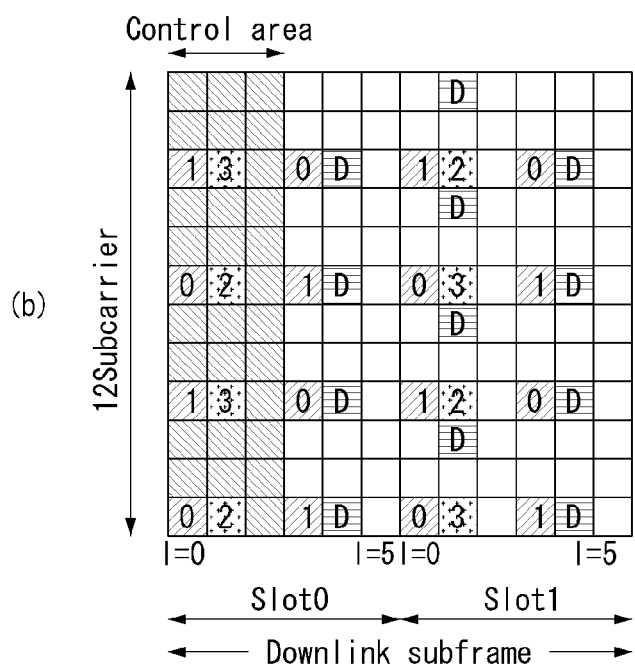

[FIG. 10]
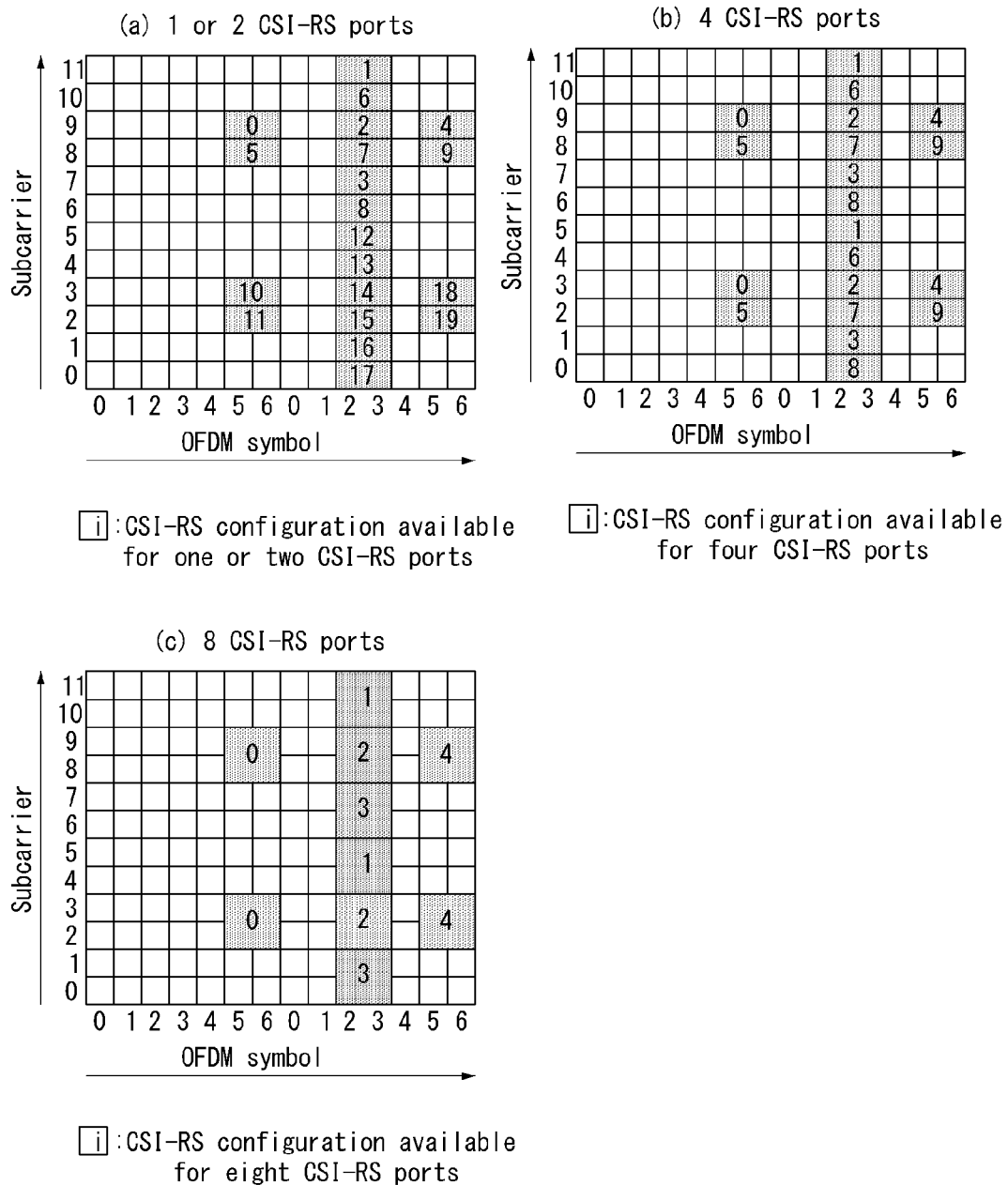

[FIG. 11]
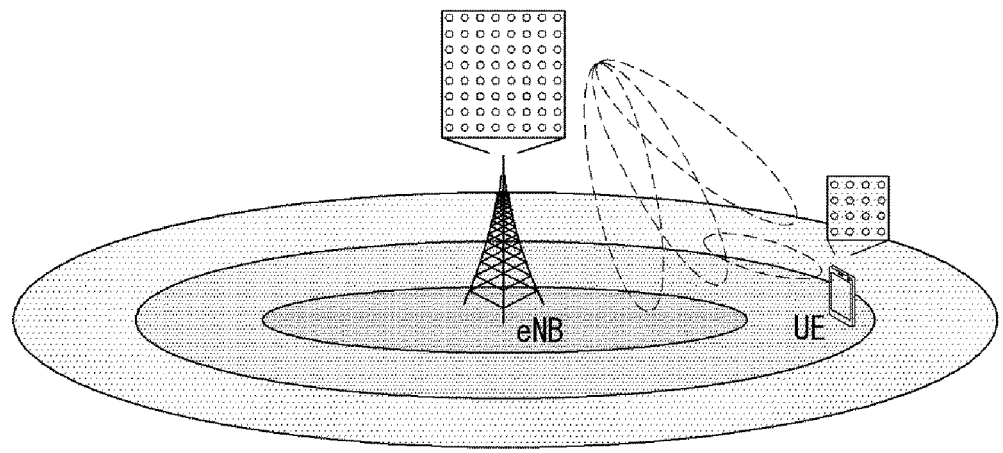

[FIG. 12]
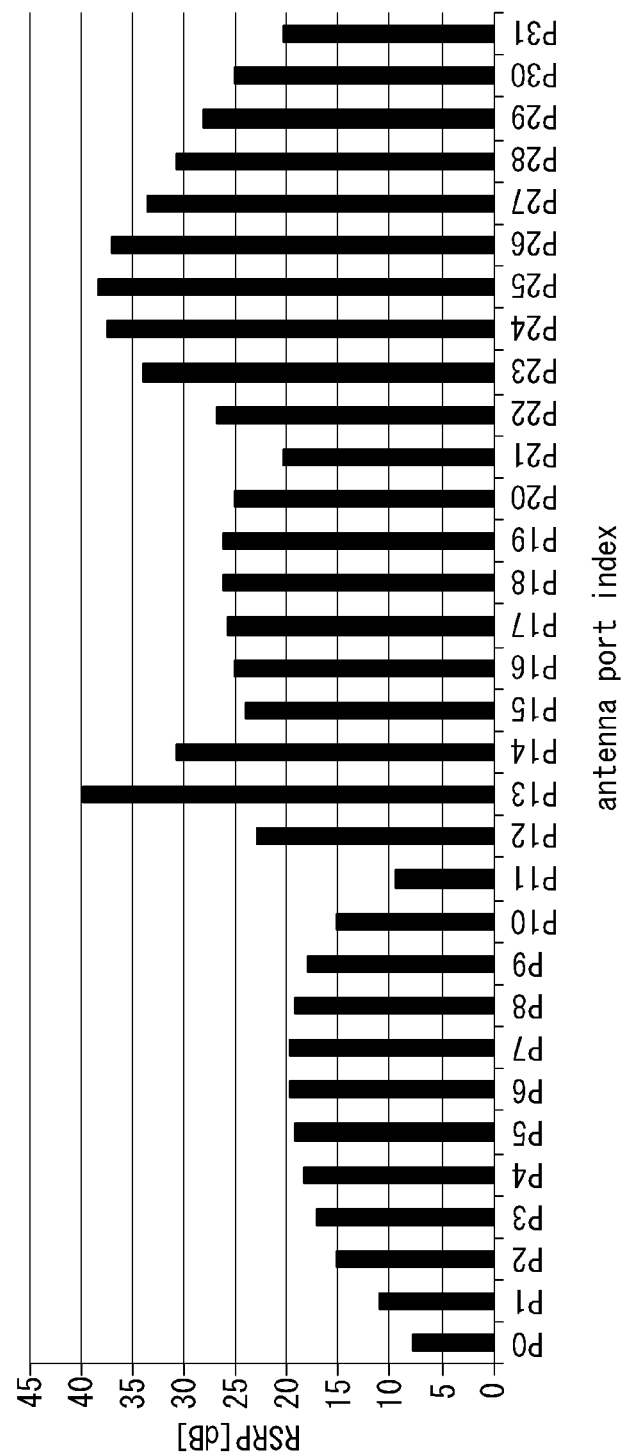

[FIG. 13]

| Group index for level 4 grouping | 0 | | | | | | | | 1 | | | | | | | |
|---|---|---|---|---|---|---|---|---|---|---|---|---|---|---|---|---|
| Group index for level 3 grouping | 0 | | | | | | | | 1 | | | | 3 | | | |
| Group index for level 2 grouping | 0 | | | | 1 | | | | 2 | | | | 3 | | | |
| Group index for level 1 grouping | 0 | 1 | 2 | 3 | 4 | 5 | 6 | 7 | 8 | 9 | 10 | 11 | 12 | 13 | 14 | 15 |
| | P0 | P1 | P2 | P3 | P4 | P5 | P6 | P7 | P8 | P9 | P10 | P11 | P12 | P13 | P14 | P15 |

【FIG. 14】
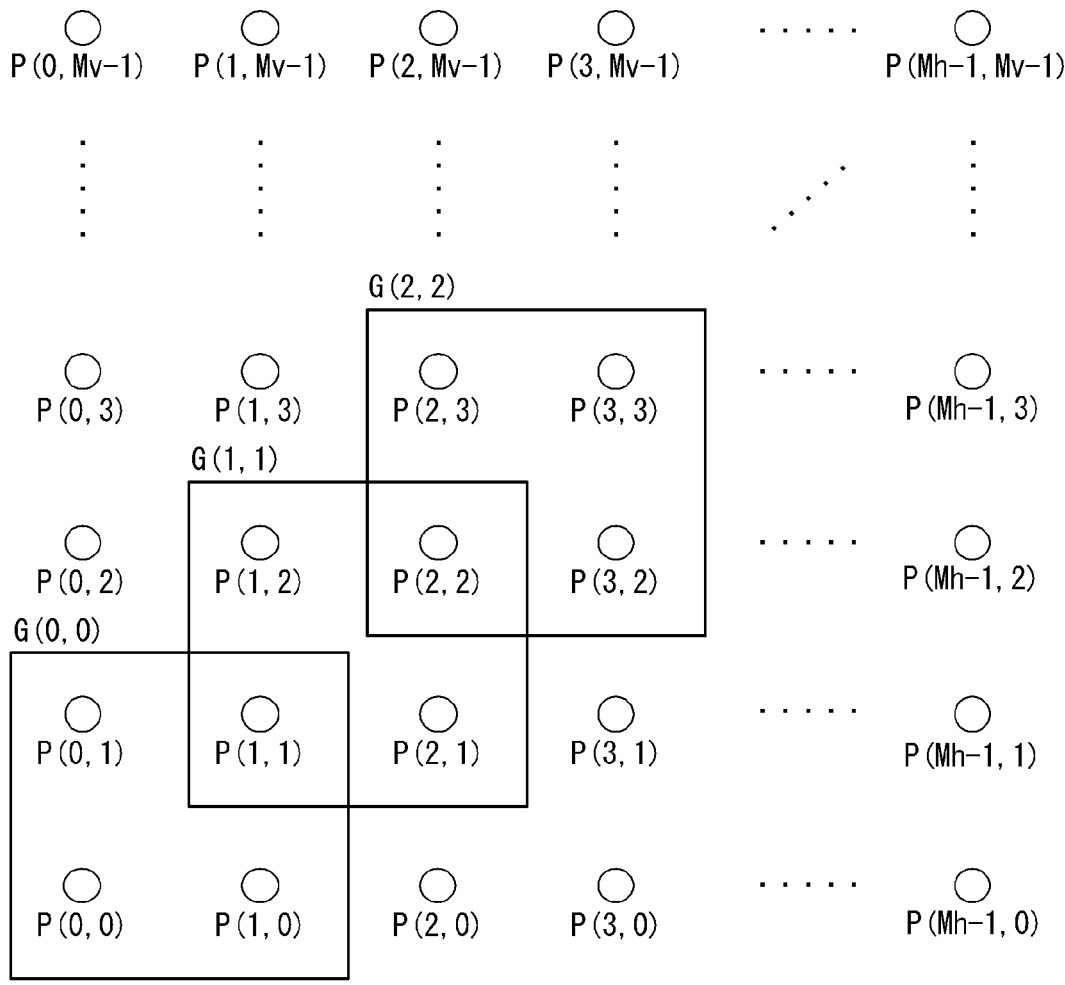
【FIG. 15】
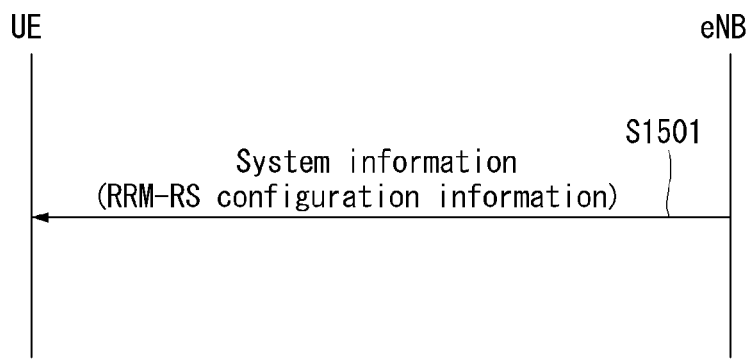

[FIG. 16]
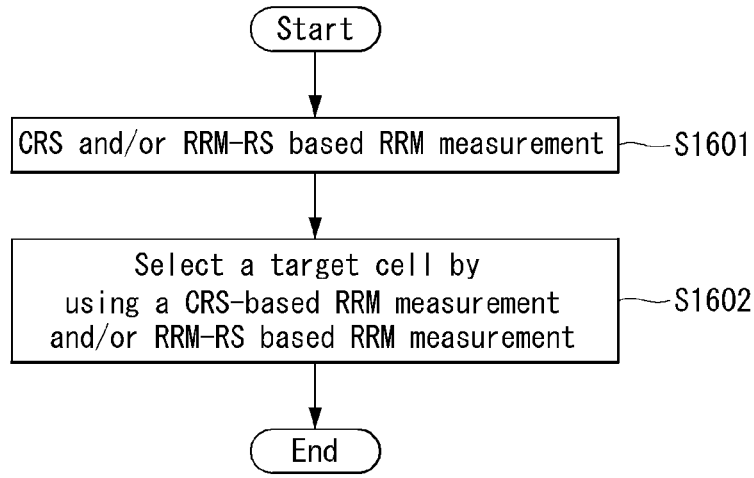
[FIG. 17]
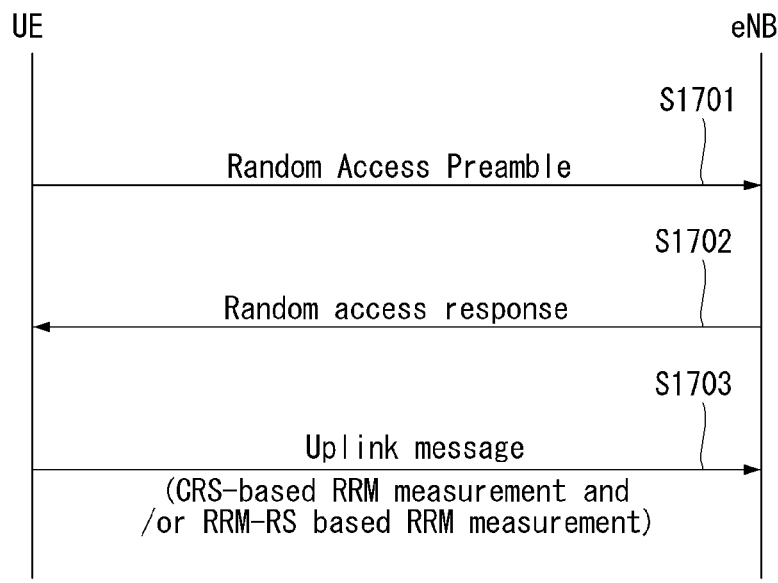

[FIG. 18]
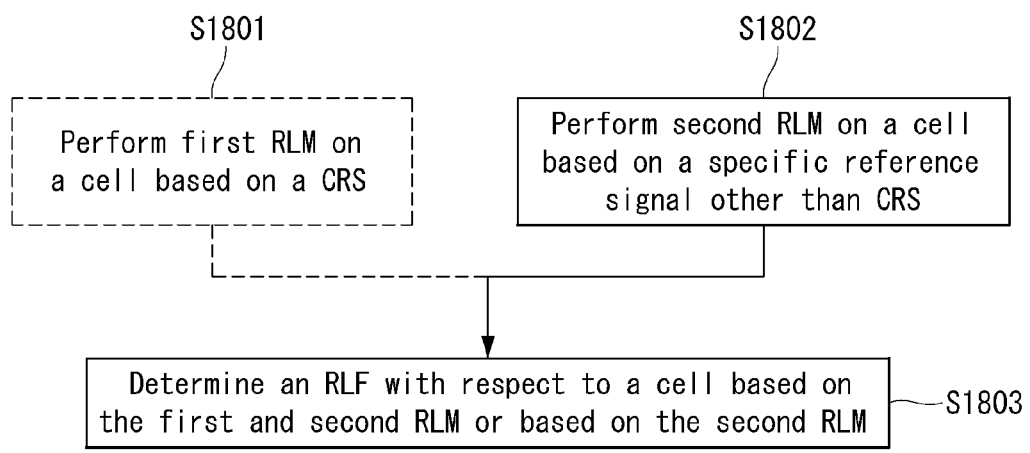
[FIG. 19]
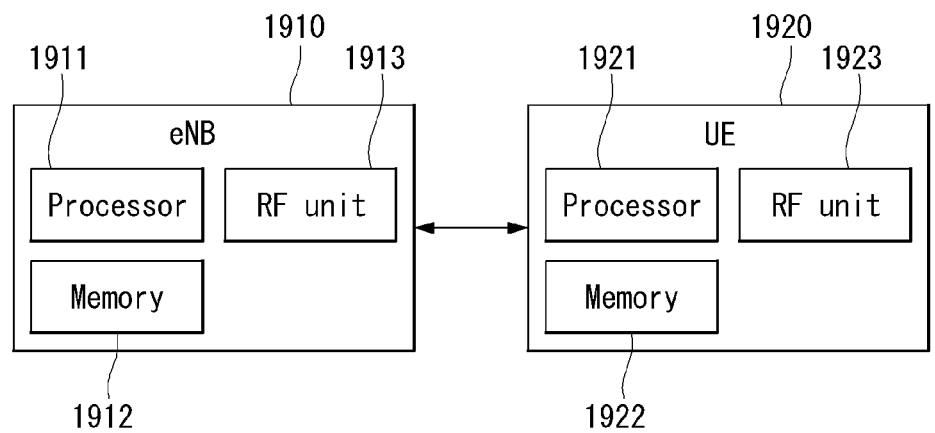

RADIO LINK MONITORING METHOD IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/000945, filed on Jan. 28, 2016, which claims the benefit of U.S. Provisional Application No. 62/109,616, filed on Jan. 30, 2015, the contents of which are all hereby incorporated by reference herein in their entirety.

TECHNICAL FIELD

The present invention relates to a wireless communication system. More specifically, the present invention relates to a method for a mobile terminal to perform radio link monitoring based on a reference signal and an apparatus supporting the method.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method for a mobile terminal to (re)select a cell based on an RRM (Radio Resource Management)-RS (Reference Signal) for measuring a radio resource configured separately from a CRS (Cell-specific Reference Signal).

Also, an object of the present invention is to provide a method for performing an initial access process on the best cell selected based on a RRM-RS.

Also, an object of the present invention is to provide a method for performing radio link monitoring based on a non-CRS reference signal.

Technical objects of the present invention are not limited to those objects described above; other technical objects not mentioned above can be clearly understood from what are described below by those skilled in the art to which the present invention belongs.

Technical Solution

According to one aspect of the present invention, a method for a user equipment (UE) to perform Radio Link Monitoring (RLM) in a wireless communication system comprises performing second RLM on a cell based on a Reference Signal (RS) other than a Cell-specific Reference Signal (CRS) and determining an Radio Link Failure (RLF) with respect to the cell based on the second RLM, wherein a condition for determining an RLF applied to the second RLM may be different from the condition for determining an RLF applied to CRS-based first RLM.

According to another aspect of the present invention, a user equipment (UE) for performing Radio Link Monitoring (RLM) in a wireless communication system is configured to comprise an Radio Frequency (RF) unit for transmitting and receiving a radio signal and a processor controlling the RF unit, to perform second RLM on a cell based on a Reference Signal (RS) other than a Cell-specific Reference Signal (CRS), and to determine an Radio Link Failure (RLF) with respect to the cell based on the second RLM, wherein a condition for determining an RLF applied to the second RLM may be different from the condition for determining an RLF applied to CRS-based first RLM based.

Preferably, the method according to the present invention further comprises performing the first RLM based on the CRS, wherein the RLF with respect to the cell may be determined based on the first and the second RLM.

Preferably, the condition for determining an RLF may include at least one of a control channel transmission parameter, a threshold value for determining a state of a mobile terminal between an out-of-sync and in-sync status, and an RLF timer.

Preferably, according to the present invention, in the case of the second RLM, it may be assumed that Downlink Control Information (DCI) for the second monitoring is transmitted from a predetermined Enhanced Physical Downlink Control Channel (EPDCCH) set.

Preferably, according to the present invention, in case the mobile terminal is capable of supporting Full Dimension-Multi Input Multi Output (FD-MIMO), the second RLM may be performed.

Preferably, according to the present invention, in case the mobile terminal is capable of supporting FD-MIMO, and FD-MIMO mode of the mobile terminal is activated, the second RLM may be performed.

Preferably, according to the present invention, in case an RLF with respect to the cell is determined based on the first RLM and the second RLM, and at least one of the first and the second RLM determines an RLF with respect to the cell, an RLF with respect to the cell may be determined.

Preferably, according to the present invention, one of the first and the second RLM may have a high priority in determining an RLF with respect to the cell.

Preferably, according to the present invention, in case an RLF with respect to the cell is determined based on the first and the second RLM, when an RLF with respect to the cell is determined by both of the first and the second RLM, an RLF with respect to the cell may be determined.

Preferably, according to the present invention, the second RLM may be performed when a predetermined condition is met by the first RLM.

Preferably, according to the present invention, the second RLM may be started after a predetermined offset time from since an RLF timer due to the first RLM is activated.

Preferably, according to the present invention, during a period from when an RLF timer due to the first RLM is activated until when a procedure for the mobile terminal to select or reselect other cell is completed, DCI may be received through an EPDCCH set associated with the second RLM, and downlink data scheduled by the DCI may be received through a Physical Downlink Shared Channel (PDSCH).

Preferably, according to the present invention, only the DCI masked with a predetermined Radio Network Temporary Identifier (RNTI) may be received through the EDPCCH set.

Preferably, according to the present invention, the RS other that the CSI reference signal may correspond to one of a Channel State Information-Reference Signal (CSI-RS), Discovery Reference Signal (DRS), precoded reference signal, and reference signal transmitted from an amorphous cell comprising different cells or a number of Transmission Points (TPs) configured to operate during a cell (re)selection-related operation.

Advantageous Effects

According to an embodiment of the present invention, the best cell yielding the highest efficiency to a mobile terminal may be selected in a wireless communication system, particularly, in an environment employing full-dimension MIMO or supporting an advanced amorphous cell.

Also, according to an embodiment of the present invention, latency in the initial cell access process of a mobile terminal may be minimized by performing initial access to the best cell yielding the highest efficiency for the mobile terminal.

Also, according to an embodiment of the present invention, by performing initial access to the best cell yielding the highest efficiency for a mobile terminal, the mobile terminal may enter a normal operating condition quickly without involving an additional hand-over or cell re-selection process.

Also, according to an embodiment of the present invention, radio link quality due to a beamforming channel (for example, a channel to which FD-MIMO (Full Dimension Multi-Input Multi-Output) has been applied) may be taken into account by determining a radio link failure by using non-CRS reference signal-based radio link monitoring (together with CRS-based radio link monitoring).

Also, according to an embodiment of the present invention, by taking into account radio link quality due to a beamforming channel, occurrence of a situation of losing a communication link in a good beamforming channel condition may be reduced, and performance gain due to maintaining a transmission and reception operation through the beamforming channel may be obtained.

The advantageous effect that may be obtained from the present invention are not limited to those described above, and other effects not mentioned above may be understood clearly by those skilled in the art to which the present invention belongs from the following descriptions.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 illustrates a contention-based random access procedure in a wireless communication system in which the present invention may be applied.

FIG. 9 illustrates a reference signal pattern mapped to a downlink resource block pair in a wireless communication system to which the present invention may be applied.

FIG. 10 illustrates a CSI-RS configuration in a wireless communication system to which the present invention may be applied.

FIG. 11 illustrates a system in which a base station or a mobile terminal is equipped with a plurality of transmit/receive antennas capable of AAS-based 3D (3-Dimensional) beam forming in a wireless communication system to which the present invention may be applied.

FIG. 12 illustrates RSRP for each antenna port of an RRM-RS according to one embodiment of the present invention.

FIG. 13 illustrates an RRM-RS antenna port grouping level according to one embodiment of the present invention.

FIG. 14 illustrates antenna ports of RRM-RS arranged with two-dimensional indices and antenna port groups according to one embodiment of the present invention.

FIG. 15 illustrates an RRM-RS based cell selection method according to one embodiment of the present invention.

FIG. 16 illustrates an RRM measurement method according to one embodiment of the present invention.

FIG. 17 illustrates a random access procedure according to one embodiment of the present invention.

FIG. 18 illustrates radio link monitoring according to one embodiment of the present invention.

FIG. 19 illustrates a block diagram of a wireless communication device according to one embodiment of the present invention.

BEST MODE FOR INVENTION

Some embodiments of the present invention are described in detail with reference to the accompanying drawings. A detailed description to be disclosed along with the accompanying drawings are intended to describe some exemplary embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

A General Wireless Communication System to which the Present Invention May be Applied FIG. 1 illustrates the structure of a radio frame in a wireless communication system to which the present invention may be applied.

The 3GPP LTE/LTE-A system supports a type 1 radio frame structure that may be applied to the FDD (Frequency Division Duplex) scheme and a type 2 radio frame structure that may be applied to the TDD (Time Division Duplex) scheme.

As shown in FIG. 1, the size of a radio frame in the time domain is expressed by a multiple of $T\_s=1/(15000*2048)$. Downlink and uplink transmission are performed by a radio frame having a time interval of $T\_f=307200*T\_s=10$ ms.

FIG. 1(a) illustrates the type 1 radio frame structure. The type 1 radio frame may be applied to both of full duplex and half duplex schemes.

A radio frame comprises 10 subframes. One radio frame consists of 20 slots having a length of $T\_slot=15360*T\_s=0.5$ ms, and each slot is denoted by an index ranging from 0 to 19. One subframe consists of two slots consecutive in the time domain, and subframe i consists of slot 2i and slot 2i+1. The time required to transmit one subframe is called TTI (Transmission Time Interval). For example, the length of one subframe may be 1 ms, and the length of one slot may be 0.5 ms.

Uplink and downlink transmission according to the FDD scheme are distinguished from each other in the frequency domain. While a mobile terminal suffers no restriction for transmission and reception in the case of full-duplex FDD operation, the mobile terminal is not allowed to perform transmission and reception simultaneously in the case of half-duplex FDD operation.

One slot includes a plurality of OFDM (Orthogonal Frequency Division Multiplexing) symbols in the time domain and a plurality of RBs (Resource Blocks) in the frequency domain. Since the 3GPP LTE system employs OFDMA for downlink transmission, an OFDM symbol is used to represent one symbol period. One OFDM symbol may be regarded as one SC-FDMA symbol or symbol period. A resource block is a unit for resource allocation, and one slot includes a plurality of consecutive subcarriers.

FIG. 1(b) illustrates a type 2 frame structure.

A type 2 radio frame consists of two half-frames, each of which has a length of $153600*T\_s=5$ ms. Each half-frame consists of 5 subframes, each of which has a length of $30720*T\_s=1$ ms.

The uplink-downlink configuration in the type 2 frame structure of the TDD system is a rule indicating whether the uplink and downlink are allocated (or reserved) for all of the subframe.

Table 1 illustrates the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, for each subframe of a radio frame, 'D' represents a subframe for downlink transmission, 'U' a subframe for uplink transmission, and 'S' a special subframe comprising three fields: a DwPTS (Downlink Pilot Time Slot), Guard Period (GP), and UpPTS (Uplink Pilot Time Slot).

DwPTS is used for a UE to perform an initial cell search, synchronization or channel estimation. UpPTS is used for the eNB's channel estimation and the UE's uplink transmission synchronization. GP is an interval aimed for removing interference caused in a uplink due to a multi-path delay of a downlink signal between the uplink and downlink.

Each subframe i comprises a slot 2i and a slot 2i+1, each of which has a length of 0.5 ms (T_slot=15360*T_s=0.5 ms).

The uplink-downlink configuration may be classified into 7 types, and for each configuration, positions and/or the numbers of downlink, special, and uplink subframes are different.

The time point at which a transmission direction is changed from downlink to uplink or the other way around is called a switching point. The switch-point periodicity of the switching point refers to a period at which switching between a uplink subframe and a downlink subframe is repeated in the same manner, and both 5 ms and 10 ms are supported. In case the downlink-uplink switch-point period is 5 ms, the special frame S exists for each half-frame while, in case the downlink-uplink switch-point period is 5 ms, the special frame exists only in the first hald-frame.

For each configuration, the 0-th, fifth subframe, and DwPTS are intended only for downlink transmission. UpPTS and the subframe immediately following the subframe are always used for uplink transmission.

The uplink-downlink configuration is system information, and both the eNB and the UE may be informed of the configuration. Each time the uplink-downlink configuration information is changed, the eNB may inform the UE of the changed state of uplink-downlink allocation in a radio frame by transmitting only the index of the configuration information. Also, the configuration information is a kind of downlink control information and may be transmitted through a PDCCH (Physical Downlink Control Channel) like other scheduling information; similarly, the configuration information may be transmitted as broadcast information to all of the UEs within a cell through a broadcast channel.

Table 2 shows configuration of a special subframe (length of DwPTS/GP/UpPTS).

TABLE 2

| | Normal cyclic prefix in downlink | | | Extended cyclic prefix in downlink | | |
| --- | --- | --- | --- | --- | --- | --- |
| | | UpPTS | | | UpPTS | |
| | | Normal | | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio frame according to FIG. 1 is only an example; therefore, the number of subcarriers included in the radio frame, the number of slots included in the subframe, and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

An EPDCCH (Enhanced PDCCH) carries UE-specific signaling. An EPDCCH is disposed at a PRB (Physical Resource Block) determined in a UE-specific manner. In other words, as described above, a PDCCH may be transmitted from up to three OFDM symbols in a first slot of a subframe, but an EPDCCH may be transmitted for a non-PDCCH resource region. The starting point (namely, symbol) at which an EPDCCH is started in a subframe may be set to a UE through upper layer signaling (for example, RRC signaling).

An EPDCCH may carry a transmission format related to the DL-SCH; resource allocation and HARQ information; transmission format related to the UL-SCH; resource allocation information related to the SL-SCH (Sidelink Shared Channel) and PSCCH (Physical Sidelink Control Channel). Multiple EPDCCHs may be supported, and a UE may monitor a set of EPCCHs.

An EPDCCH may be transmitted by using one or more consecutive ECCEs (Enhanced CCEs), and for each EPDCCH format, the number of ECCEs for each EPDCCH may be determined.

Each ECCE may comprise a plurality of EREGs (Enhanced Resource Element Groups). An EREG is used for defining mapping to Res. For each PRB pair, 16 EREGs may be defined. In each PRB pair, except for those REs carrying a DMRS, all of the REs are numbered ranging from 0 to 15 in the increasing order of frequency and then in the increasing order of time.

The UE may monitor a plurality of EPDCCHs. For example, one or two EPDCCH sets may be configured within one PRB pair for which the UE monitors EPDCCH transmission.

As a different number of ECCEs are merged together, different coding rates may be implemented for an EPCCH. An EPCCH may employ localized transmission or distributed transmission, according to which mapping of the ECCE to an RE within a PRB may be varied.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, ..., x_NT that are actually transmitted. In this case, the weight matrix functions to properly distribute the transmission information to antennas according to a transport channel condition. The following may be represented using the transmission signals x_1, x_2, ..., x_NT.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix}$$

$$= W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, ..., y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_{i1}^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, ..., n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following to relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined to as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnection-Reconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 7 shows an example of component carriers and a carrier aggregation in a wireless communication system to which an embodiment of the present invention may be applied.

FIG. 7a shows the structure of a single carrier used in an LTE system. A component carrier includes a DL CC and an UL CC. One component carrier may have a frequency range of 20 MHz.

FIG. 7b shows the structure of a carrier aggregation used in an LTE-A system. FIG. 7b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

Random Access Procedure

In what follows, a random access procedure provided by the LTE/LTE-A system will be described.

A UE employs the random access procedure to obtain uplink synchronization with an eNB or to have uplink radio resources. After being powered up, the UE acquires downlink synchronization with an initial cell and receives system information. From the system information, the UE obtains a set of available random access preambles and information about a radio resource used for transmission of a random access preamble. The radio resource used for transmission of a random access preamble may be specified by a combination of at least one or more subframe indices and indices on the frequency domain. The UE transmits a random access preamble selected in a random fashion from the set of random access preambles, and the eNB receiving the random access preamble transmits a TA (Timing Alignment) value for uplink synchronization through a random access response. By using the procedure above, the UE obtains uplink synchronization.

The random access procedure is common to FDD (Frequency Division Duplex) and TDD (Time Division Duplex) scheme. The random access procedure is independent of a cell size and is also independent of the number of serving cells in case CA (Carrier Aggregation) is configured.

First, a UE performs the random access procedure in the following cases.

The case in which a UE performs initial access in an RRC idle state in the absence of an RRC connection to an eNB The case in which a UE performs an RRC connection re-establishment procedure The case in which a UE connects to a target cell for the first time while performing a handover procedure The case in which a random access procedure is requested by a command from an eNB The case in which downlink data are generated while uplink synchronization is not met in the RRC connected state The case in which uplink data are generated while uplink synchronization is not met in the RRC connected state or a designated radio resource used for requesting a radio resource is not allocated The case in which positioning of a UE is performed while timing advance is needed in the RRC connected state The case in which a recovery process is performed at the time of a radio link failure or handover failure The 3GPP Rel-10 specification takes into account applying a TA (Timing Advance) value applicable to one specific cell (for example, P cell) commonly to a plurality of cells in a wireless access system. However, a UE may combine a plurality of cells belonging to different frequency bands (namely separated with a large distance from each other in the frequency domain) or a plurality of cells having different propagation characteristics. Also, in the case of a specific cell, if the UE performs communication with the eNB (namely macro eNB) through one cell and performs communication with the SeNB through other cell while a small cell such as an RRH (Remote Radio Header) (namely repeater), femto-cell, or pico-cell or a secondary eNB (SeNB) is disposed within the cell for coverage expansion or removal of a coverage hole, a plurality of cells may have different propagation delays. In this case, when the UE performs uplink transmission so that one TA value is applied commonly to a plurality of cells, synchronization of uplink signals transmitted among the plurality of cells may be seriously influenced. Therefore, it may be preferable to have multiple TA values under the CA mode in which a plurality of cells are aggregated. The 3GPP Rel-11 specification takes into account allocating a TA value separately for each specific cell group to support multiple TA values. This is called a TA group (TAG); a TAG may have one or more cells, and the same TA value may be applied commonly to one or more cells belonging to the TAG. To support the multiple TA values, a MAC TA command control element is composed of a 2-bit TAG Identity (ID) and a 6-bit TA command field.

A UE designated for carrier aggregation performs a random access procedure with respect to a PCell. In the case of a TAG to which a PCell belongs (namely primary TAG (pTAG)), a TA value determined with respect to the PCell in the same way as existing methods or adjusted through a random access procedure in association with the PCell may be applied to all of the cells belonging to the pTAG. On the other hand, in the case of a TAG consisting of only SCells (namely secondary TAG (sTAG)), a TA value determined with respect to a specific SCell of the sTAG may be applied to all of the cells belonging to the corresponding sTAG. At this time, the TA value is determined from the random access procedure initiated by the eNB. More specifically, an SCell within an sTAG is designated as a RACH resource, and the eNB requests a RACH connection from the SCell to determine the TA value. In other words, the eNB initiates RACH transmission on the SCells according to a PDCCH order transmitted from the PCell. A response message with respect to an SCell preamble is transmitted through the PCell by using an RA-RNTI. The UE may apply the TA determined with respect to the SCell which has successfully completed random access to all of the cells belonging to the corresponding sTAG. In this manner, the random access procedure may be performed even in an SCell to acquire timing to alignment of an sTAG to which the corresponding SCell belongs.

In a process of selecting a random access preamble (RACH preamble), the LTE/LTE-A system supports both of a contention based random access procedure and a non-contention based random access procedure. In the former procedure, a UE selects one arbitrary preamble from a specific set, while, in the latter procedure, the UE uses the random access preamble that an eNB has allocated only to the specific UE. It should be noted, however, that the non-contention based random access procedure may be confined to the handover process described above, a case requested by a command from the eNB, and UE positioning and/or timing advance alignment for sTAG. After the random access procedure is completed, the UE performs a normal uplink/downlink transmission.

Meanwhile, a relay node (RN) also support both of the contention based random access procedure and the non-contention based random access procedure. When a relay node performs the random access procedure, RN subframe configuration is suspended. In other words, this indicates that the UE temporarily discards RN subframe configuration. Afterwards, when the random access procedure is successfully completed, the UE resumes the RN subframe configuration.

FIG. 8 illustrates a contention-based random access procedure in a wireless communication system to which the present invention may be applied.

(1) Msg 1 (Message 1)

First, a UE selects one random access preamble (RACH preamble) randomly from a set of random access preambles indicated by system information or a handover command. The UE then selects a PRACH (Physical RACH) resource capable of transmitting the random access preamble and transmits the random access preamble by using the PRACH resource.

A random access preamble is transmitted in six bits on the RACH transmission channel, where the six bit comprises a 5-bit random identity for identifying a UE which transmits a RACH preamble and 1 bit for representing additional information (for example, indicating size of Msg 3).

An eNB which has received a random access preamble from a UE decodes the preamble and obtains RA-RNTI. A time-frequency resource of a random access preamble transmitted by the corresponding UE determines the RA-RNTI related to a PRACH to which a random access preamble is transmitted.

(2) Msg 2 (Message 2)

The eNB transmits a random access response to the UE, where the RA-RNTI obtained by using the preamble on Msg 1 addresses the RA-RNTI. A random access response may include an RA preamble index/identifier, UL grant indicating a uplink radio resource, Temporary C-RNTI (TC-RNTI), and Time Alignment Command (TAC). A TAC indicates a time synchronization value that the eNB transmits to the UE to maintain uplink time alignment. The UE updates uplink transmission timing by using the time synchronization value. If the UE updates time synchronization, the UE initiates or restarts a time alignment timer. The UL grant includes uplink resource allocation and TPC (Transmit Power Command), where the UE uses uplink resource allocation for transmitting a scheduling message (Msg 3) to be described later. The UE uses the TPC for determining transmission power for a scheduled PUSCH.

The UE attempts to receive a random access response within a random access response window indicated by the eNB through system information or a handover command, detects a PDCCH masked with an RA-RNTI corresponding to the PRACH, and receives a PDSCH indicated by the detected PDCCH. The UE may transmit the random access response information in the form of a MAC PDU (MAC Packet Data Unit) and may transmit the MAC PDU through the PDSCH. It is preferable that the PDCCH should include information of the UE that has to receive the PDSCH, frequency and time information of a radio resource of the PDSCH, and transmission format of the PDSCH. As described above, once the UE succeeds to detect the PDCCH transmitted to itself, it may properly receive a random access response transmitted to the PDSCH according to the information of the PDCCH.

The random access response window refers to a maximum time interval in which the UE transmitting a preamble waits to receive a random access response message. The random access response window has a length of 'ra-ResponseWindowSize' starting from a subframe after three subframes in the last subframe transmitting a preamble. In other words, the UE waits to receive a random access response during a random access window secured after three subframes from the subframe completed transmission of the preamble. The UE may obtain the random access window size ('ra-ResponseWindowsize') parameter through system information, and the random access window size is determined to be a value between 2 to 10.

If receiving a random access response having the same random access preamble identity as that of the random access preamble transmitted to the eNB, the UE stops monitoring the random access response. On the other hand, if failing to receive a random access response message until a random access response window is terminated or failing to receive a valid random access response having the same random access preamble identity as that of the random access preamble transmitted to the eNB, the UE may consider reception of the random access response as having failed and then perform retransmission of the preamble.

As described above, the reason why a random access preamble identity is needed for a random access response is that one random access response may include random access response information for one or more UEs and thus it is necessary to indicate to which UE the UL grant, TC-RNTI, and TAC is valid.

(3) Msg 3 (Message 3)

Receiving a valid random access response, the UE separately processes the information included in the random access response. In other words, the UE applies the TAC and stores the TC-RNTI. Also, by using the UL grant, the UE transmits the data stored in its buffer or newly generated data to the eNB. In case the UE is connected for the first time, the UE may transmit an RRC Connection request generated at the RRC layer and transmitted through a CCCH by including the RRC Connection request in the Msg 3. And in the case of an RRC Connection Re-establishment procedure, the UE may transmit an RRC Connection Re-establishment request generated at the RRC layer and transmitted through the CCCH by including the RRC Connection Re-establishment request in the Msg 3. Also, the UE may include a NAS connection request message in the Msg 3.

The Msg 3 has to include a UE identity. In the case of a contention based random access procedure, the eNB is unable to determine which UEs perform the random access procedure. Thus, the eNB needs the UE identity for each UE to avoid potential contention.

There are two methods for including UE identities. In the first method, if the UE already has a valid cell identity (C-RNTI) allocated by the corresponding cell before performing the random access procedure, the UE transmits its cell identity though a uplink transmission signal corresponding to the UL grant. On the other hand, if the UE has not received a valid cell identity before performing the random access procedure, the UE transmits its unique identity (for example, S-TMSI or a random number). In most cases, the unique identity is longer than the C-RNTI. The UE uses UE-specific scrambling for transmission on UL-SCH. In case the UE has not received a C-RNTI yet, the UE is unable to perform C-RNTI based scrambling but uses a TC-RNTI received from a random access response instead. If having received data corresponding to the UL grant, the UE initiates a contention resolution timer for resolving contention.

(4) Msg 4 (Message 4)

Receiving the C-RNTI of a UE through the Msg 3 from the corresponding UE, the eNB transmits a Msg 4 to the UE by using the receiving C-RNTI. On the other hand, in case the eNB receives the unique identity (namely S-TMSI or a random number) through the Msg 3, the eNB transmit the Msg 4 to the UE by using a TC-RNTI allocated to the corresponding UE from a random access response. Here, the Msg 4 may include an RRC Connection Setup message including the C-RNTI.

After transmitting data containing an identity through a UL grant included in the random access response, the UE waits for a command from the eNB to resolve contention. In other words, two methods are available for a method for receiving the PDCCH, too. As described above, in case the UE uses the C-RNTI from the Msg 3 transmitted in response to the UL grant for its identity, the UE attempts to receive the PDCCH by using its C-RNTI. In case the identity is a unique identity (in other words, S-TMSI or a random number), the UE attempts to receive the PDCCH by using the TC-RNTI included in the random access response. Afterwards, in the former case, if the UE receives the PDCCH though its C-RNTI before the contention resolution timer expires, the UE determines that the random access procedure has been performed normally and terminates the random access procedure. In the latter case, if the UE receives the PDCCH through the TC-RNTI before the contention resolution timer is completed, the UE checks the data transmitted by the PDSCH indicated by the PDCCH. If the data contains a unique identity of the UE, the UE determines that the random access procedure has been performed successfully and terminates the random access procedure. The UE obtains the C-RNTI through the Msg 4, after which the UE and the network transmit and receive a UE dedicated message by using the C-RNTI.

Next, a method for resolving contention during random access will be described.

The reason why contention occurs during random access is that the number of random access preambles is, in principle, finite. In other words, since the eNB is unable to assign random access preambles unique to the respective UEs, a UE selects and transmits one from among common random access preambles. Accordingly, although there are cases where two or more UEs select and transmit the same random access preamble by using the same radio resource (PRACH resource), the eNB considers the random access preamble as the one transmitted from a single UE. Thus, the eNB transmits a random access response to the UE and expects that only one UE receive the random access response. However, as described above, because of the possibility of contention, two or more UEs receive the same random access response, and each receiving UE performs an operation due to the random access response. In other words, a problem occurs where two or more UEs transmit different data to the same radio resource by using one UL grant included in the random access response. Accordingly, transmission of the data may all fail, or the eNB may succeed to receive only the data from a specific UE depending on the positions of transmission power of UEs. In the latter case, since two or more UEs assume that they all have succeeded to transmit their data, the eNB has to inform those UEs that have failed in the contention about their failure. In other words, contention resolution refers to the operation of informing a UE about whether it has succeeded or failed.

Two methods are used for contention resolution. One of the methods employs a contention resolution timer and the other method employs transmitting an identity of a successful UE to other UEs. The former case is used when a UE already has a unique C-RNTI before performing a random access process. In other words, a UE that already has a C-RNTI transmits data including its C-RNTI to the eNB according to a random access response and operates a contention resolution timer. And if the UE receives a PDCCH indicated by its C-RNTI before the contention resolution timer expires, the UE determines that it has won the contention and finishes random access normally. On the other hand, if the UE fails to receive a PDCCH indicated by its C-RNTI before the contention resolution timer expires, the UE determines that it has lost the contention and performs the random access process again or inform a upper layer of the failure. The latter contention resolution method, namely the method for transmitting an identity of a successful UE, is used when a UE does not have a unique cell identity before performing the random access process. In other words, in case the UE has no cell identity, the UE transmits data by including a upper identity (S-TMSI or a random number) higher than a cell identity in the data according to the UL grant information included in a random access response and operates a contention resolution timer. In case the data containing the upper identity of the UE is transmitted to a DL-SCH before the contention resolution timer expires, the UE determines that the random access process has been performed successfully. On the other hand, in case the data containing the upper identity of the UE is not transmitted to the DL-SCH before the contention resolution data expires, the UE determines that the random access process has failed.

Meanwhile, different from the contention based random access process illustrated in FIG. 11, a non-contention based random access process finishes its procedures only by transmitting the Msg 1 and 2. However, before the UE transmits a random access preamble to the eNB as the Msg 1, the eNB allocates a random access preamble to the UE. The random access procedure is terminated as the UE transmits the allocated random access preamble to the eNB as the Msg 1 and receives a random access response from the eNB.

Reference Signal

Since data are transmitted through a radio channel in a wireless communication system, a signal may be distorted during transmission. In order for a receiver to receive a signal without a distortion, distortions in a received signal have to be compensated by using channel information. To detect channel information, a signal transmission method that are known to both of the transmitter and the receiver and a method for detecting channel information by using the degree of a distortion caused when a signal is transmitted through a radio channel are used for most cases. The aforementioned signal is called a pilot signal or reference signal (RS).

Also, most of recent mobile communication systems employ a method for improving transmission and reception data rates by adopting multiple transmission and reception antennas instead of using a method based on a single transmission and reception antenna that has been widely used so far. When data are transmitted and received by using a MIMO antenna, a channel condition between a transmission antenna and a reception antenna has to be detected to receive a signal accurately. Therefore, each transmission antenna has to have its own reference signal.

In a mobile communication system, an RS may be divided into two types depending on its intended use. An RS may be used for obtaining channel information and data demodulation. The former is intended for a UE to obtain downlink channel information. Therefore, an RS has to be transmitted over a broadband, and a UE, even if it does not receive downlink data at a specific subframe, has to receive and measure the RS. In this case, an RS is also used for measurement of handover. On the other hand, in the latter case, when an eNB transmits downlink data, an RS is transmitted together to the corresponding resource. A UE is capable of performing channel estimation by receiving the corresponding US and thus demodulate the data. The RS has to be transmitted to the area to which data are transmitted.

A downlink reference signal may be further divided into a single common reference signal (CRS) for obtaining information about a channel shared by all of the UEs belonging to a cell and measuring handover; and a dedicated RS used for data demodulation only for a specific UE. By using these reference signals, information for demodulation and channel measurement may be provided. In other words, a DRS is used only data demodulation, while a CRS is used for both channel information acquisition and data demodulation.

A receiver (namely UE) measures a channel condition from the CRS and provides an indicator related to channel quality such as CQI (Channel Quality Indicator), PMI (Precoding Matrix Index) and/or RI (Rank Indicator) back to the transmitter (namely eNB). The CRS stands for Cell-specific Reference Signal (RS). On the other hand, a CSI-RS may be defined as a reference signal related to feedback of Channel State Information (CSI).

A DRS may be transmitted through resource elements when data demodulation on the PDSCH is needed. The UE is able to receive information indicating existence of a DRS through an upper layer, and the information is valid only when the corresponding PDSCH is mapped. The DRS may be called a UE-specific RS or a Demodulation RS (DMRS).

FIG. 9 illustrates a reference signal pattern mapped to a downlink resource block pair in a wireless communication system to which the present invention may be applied.

Referring to FIG. 9, as a unit by which a reference signal is mapped, a downlink resource block pair may be represented by one subframe in the time domain×12 subcarriers in the frequency domain. In other words, one resource block pair on the time axis (x-axis) has a length of 14 OFDM symbols in the case of a normal CP (Cyclic Prefix) (in the case of FIG. 9($a$)) and has a length of 12 OFDM symbols in the case of an extended CP (in the case of FIG. 9($b$)). In the resource block grids, the resource elements (REs) denoted by '0', '1', '2', and '3' indicate the CRS positions of antennas with indices of '0', '1', '2', and '3', respectively; and the resource elements denoted by 'D' indicate DRS positions.

In what follows, a more detailed description of a CRS will be provided. A CRS is used for estimating a channel of a physical antenna and is distributed across the whole frequency band as a reference signal that may be received commonly by all of the UEs located within a cell. In other words, the CRS is a cell-specific signal and is transmitted for each subframe in the broadband. Also, the CRS may be used for obtaining channel state information (CSI) and data demodulation.

A CRS is defined by various formats according to an antenna arrangement at the transmitter side (eNB-side). In the 3GPP LTE system (for example, release-8), an RS with respect to a maximum of four antenna ports is transmitted according to the number of transmission antennas of the eNB. The downlink signal transmitter has three types of antenna arrangement: a single transmission antenna, two transmission antennas, and four transmission antennas. For example, in case the number of transmission antennas of the eNB is 2, CRSs with respect to the 0-th and 1st antenna port are transmitted, and in the case of four, CRSs with respect to the 0-th to 3rd antenna ports are transmitted respectively. The CRS pattern in one RB for the case when the number of transmission antennas of the eNB is 4 is shown in FIG. 9.

In case the eNB uses a single transmission antenna, a reference signal for a single antenna port is arranged.

In case the eNB uses two transmission antennas, a reference signal for the two transmission antennas is arranged by using the TDM (Time Division Multiplexing) and/or FDM (Frequency Division Multiplexing) scheme. In other words, different time resources and/or frequency resources are allocated to distinguish reference signals for two antenna ports from each other.

Moreover, in case the eNB uses four transmission antennas, reference signals for the four transmission antennas are arranged by using the TDM and/or FDM scheme. The channel information measured by the receiver side (UE) of a downlink signal may be used to demodulate data by using a transmission method such as transmission using a single transmission antenna, transmission diversity, closed-loop spatial multiplexing, open-loop spatial multiplexing, or multi-user MIMO antenna.

In case a MIMO antenna is supported, when a reference signal is transmitted from a specific antenna port, the reference signal is transmitted to specific resource elements according to the pattern of the reference signal but is not transmitted to the resource elements for other antenna ports. In other words, reference signals among different antennas do not overlap with each other.

In what follows, a more detailed description of a DRS will be provided. A DRS is used for demodulating data. The precoding weight used for a specific UE in MIMO antenna transmission is combined with a transmission channel transmitted from each transmission antenna when the UE receives a reference signal. The combined precoding weight is then used without being modified for estimating the corresponding channel.

The 3GPP LTE system (for example, release-8) supports up to four transmission antennas and defines a DRS for rank 1 beamforming. The DRS for rank 1 beamforming also represents a reference signal for an antenna port index 5.

The LTE-A system, which has evolved from the LTE system, has to be designed to support up to 8 transmission antennas for downlink transmission of the eNB. Therefore, an RS for up to 8 transmission antennas also has to be supported. The LTE system defines a downlink RS for up to 4 antenna ports only. Therefore, if the eNB in the LTE-A system uses 4 up to 8 downlink transmission antennas, RSs for these antenna ports have to be additionally defined and designed. The RS for up to 8 transmission antennas has to be designed for both RS for channel measurement and RS for data demodulation as described above.

One of important factors to be considered in designing the LTE-A system is backward compatibility; namely, an LTE terminal is required to operate smoothly in the LTE-A system, and the system has to also support the operation. In view of RS transmission, an RS has to be defined additionally for up to 8 transmission antenna ports in the time-frequency region in which a CRS defined in the LTE system is transmitted over the whole frequency band at each subframe. If an RS pattern for up to 8 transmission antennas is added in the LTE-A system over the whole frequency band for each subframe in the same way as the CRS of the existing LTE system, the RS overhead becomes excessively large.

Therefore, the RS newly designed in the LTE-A system may be classified largely into two types: an RS for channel measurement to select MCS, PMI, and the like (CSI-RS: Channel State Information-RS, Channel State Indication-RS, and so on) and an RS for demodulation of data transmitted by 8 transmission antennas (DM-RS: Data Demodulation-RS).

The CSI-RS in the LTE-A system is designed mainly for the purpose of channel measurement, which is different from the conventional CRS that is used for both measurement tasks such as channel measurement and handover monitoring and data demodulation. The CSI-RS in the LTE-A system may also be used for handover monitoring. Since the CSI-RS is transmitted only for obtaining channel state information, the CSI-RS doesn't have to be transmitted for each subframe different from the conventional CRS. To reduce the overhead of the CSI-RS, the CSI-RS is transmitted intermittently on the time axis.

For data demodulation, a dedicated DM-RS is transmitted to the UE scheduled in the corresponding time-frequency region. In other words, the DM-RS of a specific UE is transmitted only the time-frequency region in which the corresponding UE is scheduled, namely the corresponding UE receives data.

In the LTE-A system, the eNB has to transmit a CSI-RS for all of the antenna ports. Since transmitting a CSI-RS for up to 8 transmission antenna ports at each subframe causes too large overhead, the CSI-RS should not be transmitted at each subframe but transmitted intermittently along the time axis in order to reduce the overhead. In other words, the CSI-RS may be transmitted repeatedly with a period of an integer multiple of one subframe or transmitted with a specific transmission pattern. At this time, the eNB may determine the period or pattern by which the CSI-RS is transmitted.

To measure the CSI-RS, the UE has to be aware of the information about a transmission subframe index of a CSI-RS for each CSI-RS antenna port of a cell to which the UE belongs, time-frequency position of a CSI-RS resource element (RE) within the transmission subframe, and CSI-RS sequence.

The eNB in the LTE-A system has to transmit a CSI-RS to each of up to 8 antenna ports. Resources used for CSI-RS transmission of different antenna ports have to be orthogonal to each other. When one eNB transmits a CSI-RS for different antenna ports, the eNB may allocate the resources orthogonally according to the FDM/TDM scheme by mapping the CSI-RS for each antenna port to different RE. Similarly, the CSI-RS for different antenna ports may be transmitted according to the CDM scheme in which the CSI-RS is mapped to orthogonal codes.

When the eNB informs an UE belonging to the cell of the eNB about the information of the CSI-RS, the eNB has to inform the UE of the information about the time and frequency to which the CSI-RS for each antenna port is mapped. More specifically, the information may include numbers of subframes to which CSI-RS is transmitted, period at which the CSI-RS is transmitted, subframe offset with which the CSI-RS is transmitted, number of OFDM symbol to which a CSI-RS RE of a specific antenna is transmitted, frequency spacing, and offset or shift of an RE on the frequency axis.

The CSI-RS is transmitted through 1, 2, 4, or 8 antenna ports. At this time, the antenna ports used are p=15; p=15, 16; p=15, . . . , 18; and p=15, . . . , 22, respectively. CSI-RS may be defined only for the subcarrier interval of Δf=15 kHz.

(k', l') (where k' represents the subcarrier index within a resource block, and l' represents the OFDM symbol index within a slot) and condition of n_s are determined according to the CSI-RS configuration shown in Table 3 or Table 4.

Table 3 illustrates mapping of (k', l') from the CSI-RS configuration in a normal CP case.

TABLE 3

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2    0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |

TABLE 3-continued

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates (k', l') mapping from the CSI-RS configuration in an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Referring to Table 3 and 4, in the CSI-RS transmission, to reduce inter-cell interference (ICI) in a multi-cell environment and also in a heterogeneous network (HetNet), up to 32 (for the case of a normal CP) or 28 (for the case of an extended CP) different configurations are defined.

The CSI-RS configuration differs according to the number of antenna ports within a cell and CP; and neighboring cells may have as many different configurations as possible. Also, according to the frame structure, the CSI-RS configuration may be divided into the case of applying to both FDD and TDD frame and the case of applying to the TDD frame only.

Referring to Table 3 and 4 and according to the CSI-RS configuration, (k', l') and n_s are determined, and the time-frequency resource in which each CSI-RS antenna port is used for CSI-RS transmission is determined.

FIG. 10 illustrates a CSI-RS configuration in a wireless communication system to which the present invention may be applied.

FIG. 10(a) illustrates 20 CSI-RS configurations that may be used for CSI-RS transmission by one or two CSI-RS antenna ports, FIG. 10(b) illustrates 10 CSI-RS configurations that may be used by 4 CSI-RS antenna ports, and FIG. 10(c) illustrates 5 CSI-RS configurations that may be used for CSI-RS transmission by 8 CSI-RS antenna ports.

In this way, a radio resource (namely RE pair) to which the CSI-RS is transmitted is determined according to each CSI-RS configuration.

If one or two antenna ports are configured for CSI-RS transmission with respect to a specific cell, CSI-RS is transmitted on a radio resource according to the CSI-RS configuration from among 20 CSI-RS configurations shown in FIG. 10(a).

In the same way, if four antenna ports are configured for CSI-RS transmission with respect to a specific cell, CSI-RS is transmitted on a radio resource according to the CSI-RS configuration from among 10 CSI-RS configurations shown in FIG. 10(b). Also, if 8 antenna ports are configured for CSI-RS transmission with respect to a specific cell, CSI-RS is transmitted on a radio resource according to the CSI-RS configuration from among 5 CSI-RS configurations shown in FIG. 10(c).

The CSI-RS for each of two antenna ports (namely {15,16}, {17,18}, {19,20}, {21,22}) is transmitted to the same radio resource according to the CDM scheme. In the example of antenna port 15 and 16, although the CSI-RS complex symbols for the antenna port 15 and 16 are the same, they are multiplied by different orthogonal codes (for example, walsh code) and are mapped to the same radio resource. The complex symbol of the CSI-RS with respect to the antenna port 15 is multiplied with [1, 1], and the complex symbol of the CSI-RS with respect to the antenna port 16 is multiplied with [1 −1] and is mapped to the same radio resource. This operation is applied in the same way for the antenna port {17, 18}, {19, 20}, and {21, 22}.

The UE may detect the CSI-RS for a specific antenna port by multiplying a transmitted symbol by the code multiplied to the transmitted symbol. In other words, to detect the CSI-RS for the antenna port 15, the multiplied code [1 1] is multiplied, and to detect the CSI-RS for the antenna port 16, the multiplied code [1 −1] is multiplied.

Referring to FIGS. 10(a) to (c), in the case of the same CSI-RS configuration index, radio resources according to the CSI-RS configuration having a large number of antenna ports include radio resources according to the CSI-RS configuration having a fewer number of antenna ports. For example, in the case of CSI-RS configuration 0, radio resources for 8 antenna ports include radio resources for 4 antenna ports and radio resources for 1 or 2 antenna ports.

A single cell may use a plurality of CSI-RS configurations. Non-zero power (NZP) CSI-RS may use 0 or 1 CSI-RS configuration only, and zero power (ZP) CSI-RS may use 0 or several CSI-RS configurations.

For each bit set to 1 in the ZP CSI-RS (ZeroPowerCSI-RS), which is a 16-bit bitmap configured by the upper layer, the UE assumes zero transmission power for those REs (excluding those REs overlapping with the RE assuming NZP CSI-RS configured by the upper layer) corresponding to 4 CSI-RS columns of Table 3 and 4 above. The MSB (Most Significant Bit) corresponds to the lowest CSI-RS configuration index, and the next bit in the bitmap corresponds to the next CSI-RS configuration index.

The CSI-RS is transmitted only from a downlink slot satisfying the condition of (n_s mod 2) in Table 3 and 4 and from a subframe satisfying the CSI-RS subframe configuration.

In the case of type 2 frame structure (TDD), the CSI-RS is not transmitted from a subframe colliding with transmission of a special subframe, synchronization signal (SS), PBCH, or SIB 1 (SystemInformationBlockType1) message or from a subframe configured for transmission of a paging message.

Also, an RE to which a CSI-RS for some antenna port belonging to the set of antenna ports S (S={15}, S={15,16}, S={17,18}, S={19,20} or S={21,22}) is transmitted is not used for PDSCH or CSI-RS transmission of other antenna port.

Since time-frequency resources used for CSI-RS transmission may not be used for data transmission, data throughput is decreased as the CSI-RS overhead is increased. By taking into account this fact, the CSI-RS is not configured to be transmitted for each subframe but is configured to be transmitted every predetermined transmission period corresponding to a plurality of subframes. In this case, the CSI-RS transmission overhead may be reduced a lot compared with the case in which the CSI-RS is transmitted for each subframe.

Table 5 below shows the subframe period for CSI-RS transmission (in what follows, it is called 'CSI transmission period') (T_CSI-RS) and subframe offset (Δ_CSI-RS).

Table 5 illustrates CSI-RS subframe configuration.

TABLE 5

| CSI-RS-SubframeConfig $I_{CSI-RS}$ | CSI-RS periodicity $T_{CSI-RS}$ (Subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, CSI-RS transmission period (T_CSI-RS) and subframe offset (Δ_CSI-RS) are determined according to the CSI-RS subframe configuration (I_CSI-RS).

The CSI-RS subframe configuration of Table 5 may be set by either of the 'SubframeConfig' field and 'zeroTxPower-SubframeConfig' field. The CSI-RS subframe configuration may be set separately with respect to NZP CSI-RS and ZP CSI-RS.

A subframe including the CSI-RS satisfies Eq. 12 below.

$$(10n_f + \lfloor n_s/2 \rfloor - \Delta_{CSI-RS}) \bmod T_{CSI-RS} = 0 \qquad [\text{Eq. 12}]$$

In Eq. 12, T_CSI-RS represents the CSI-RS transmission period, Δ_CSI-RS represents a subframe offset value, n_f represents a system frame number, and n_s represents a slot number.

In the case of a UE for which transmission mode 9 is set with respect to a serving cell, one CSI-RS resource configuration may be configured for the UE. In the case of a UE for which transmission mode 10 is set with respect to a serving cell, one or more CSI-RS resource configuration(s) may be configured for the UE.

For each CSI-RS resource configuration, the following parameters are configured through upper layer signaling.

- In case transmission mode 10 is set, CSI-RS resource configuration identifier
- The number of CSI-RS ports
- CSI-RS configuration (refer to Table 3 and 4)
- CSI-RS subframe configuration (I_CSI-RS) (refer to Table 5)
- In case transmission mode 9 is configured, transmission power for CSI feedback (P_C)
- In case transmission mode 10 is configured, transmission power (P_C) for CSI feedback with respect to each CSI process. If CSI subframe sets C_CSI, 0 and C_CSI, 1 are configured by the upper layer with respect to the CSI process, P_C is configured for each CSI subframe set of the CSI process.
- Pseudo-random sequence generator parameter (n_ID)
- In case transmission mode 10 is configured, an upper layer parameter ('qcl-CRS-Infor-r11') including a QCL scrambling identifier (qcl-ScramblingIdentity-r11) for QCL (QuasiCo-Located) type B UE assumption, CRS port count (crs-PortsCount-r11), and MBSFN subframe configuration list (mbsfn-SubframeConfigList-r11) parameter.

When the CSI feedback value derived by the UE has a value ranging [−8, 15] dB, P_C is assumed to have a ratio of PDSCH EPRE to CSI-RS EPRE. Here, PDSCH EPRE corresponds to the symbol, where the ratio of PDSCH EPRE to CRS EPRE is p_A.

The CSI-RS and PMCH are not configured together in the same subframe of a serving cell.

In case 4 CRS antenna ports are configured in the type 2 frame structure, the UE is not configured by the CSI-RS configuration index belonging to the [20-31] set (refer to Table 3) in the case of a normal CP or the [16-27] set (refer to Table 4) in the case of an extended CP.

The UE may assume that the CSI-RS antenna port set by the CSI-RS resource configuration has a QCL relationship with respect to delay spread, Doppler spread, Doppler shift, average gain, and average delay.

The UE for which transmission 10 and QCL type B are configured may assume that the antenna ports 0-3 corresponding to the CSI-RS resource configuration and antenna ports 15-22 corresponding to the CSI-RS resource configuration have a QCL relationship with respect to Doppler spread and Doppler shift.

In the case of a UE for which transmission mode 10 is configured, one or more CSI-IM (Channel-State Information-Inference Measurement) resource configurations may be set with respect to a serving cell.

Through the upper layer signaling, the following parameters may be set for each CSI-IM resource configuration.

- ZP CSI-RS configuration (refer to Table 3 and 4)
- ZP CSI-RS subframe configuration (I_CSI-RS) (refer to Table 5)

The CSI-IM resource configuration is the same as one of the set ZP CSI-RS resource configurations.

The CSI-IM resource and PMCH within the same subframe of a serving cell are not configured simultaneously.

In the case of a UE for which transmission mode 1-9 are configured, one ZP CSI-RS resource configuration may be configured for the UE with respect to a serving cell. In the case of a UE for which transmission mode 10 is configured, one or more ZP CSI-RS resource configurations may be configured for the UE with respect to the serving cell.

Through the upper layer signaling, the following parameters may be set for ZP CSI-RS resource configuration.

- ZP CSI-RS configuration list (refer to Table 3 and 4)
- ZP CSI-RS subframe configuration (I_CSI-RS) (refer to Table 5)
- ZP CSI-RS and PMCH are not configured simultaneously in the same subframe of a serving cell.

Cell Measurement/Measurement Report

For one or several methods among the several methods (handover, random access, cell search, etc.) for guaranteeing the mobility of UE, the UE reports the result of a cell measurement to an eNB (or network).

In the 3GPP LTE/LTE-A system, the cell-specific reference signal (CRS) is to transmitted through 0, 4, 7 and 11th OFDM symbols in each subframe on the time axis, and used for the cell measurement basically. That is, a UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by a UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to a UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

Particularly, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As such, a UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

QCL Between Antenna Ports

QC/QCL (Quasi Co-Located or Quasi Co-Location) may be defined as follows.

If two antenna ports are in a QC/QCL relationship (or become QC/QCL), the UE may assume that the large-scale property of a signal transmitted through one antenna port may be inferred from the signal transmitted through another antenna port. At this time, the large-scale property includes one or more of delay spread, Doppler spread, frequency shift, average received power, and received timing.

Or it may be defined as follows. If two antenna ports are in a QC/QCL relationship (or become QC/QCL), the UE may assume that the large-scale property of a signal transmitted through one antenna port may be inferred from a radio channel through which one symbol is transmitted through the other antenna port. Here, the large-scale property includes one or more of delay spread, Doppler spread, Doppler shift, average gain, and average delay.

In other words, if two antenna ports are in a QC/QCL relationship (or become QC/QCL), it indicates that the large-scale property of a radio channel through one antenna port is the same as the large-scale property of a radio channel through the other antenna port. Taking into account a plurality of antenna ports to which an RS is transmitted, if antenna ports through which two different types of RSs are transmitted are in the QCL relationship, the large-scale property of a radio channel through one type of antenna port may be replaced with the large-scale property of a radio channel through the other type of antenna port.

In this document, the QC/QCL related definitions are not distinguished from each other. In other words, the QC/QCL concept may follow one of the definitions above. Similarly, the definition of the QC/QCL concept may be modified such that the UE may regard the antenna ports satisfying the QC/QCL assumption as transmitting a radio signal as if they were at the same location (co-located) (for example, the UE may regard that they are transmitting a radio signal at the same transmission point), and the technical principles of the present invention includes modifications similar to the example above. In the present invention, for the convenience of description, the QC/QCL related definitions are used interchangeably.

According to the QC/QCL concept, the UE may not consider non-QC/QCL antenna ports to have the same large-scale property between radio channels through the corresponding antenna ports. In other words, the UE has to perform processing separately for non-QC/QCL antenna ports configured separately for timing acquisition and tracking, frequency offset estimation and compensation, and delay estimation and Doppler estimation.

Antenna ports assuming the QC/QCL relationship provide an advantage in that the UE may perform the following operation:

Regarding delay spread and Doppler spread, the UE may apply the estimation result of power-delay-profile, delay spread and Doppler spectrum, and Doppler spread through one antenna port in the same manner to the Wiener filter used for estimation of a radio channel through the other antenna port.

Regarding frequency shift and received timing, after performing time and frequency synchronization on one antenna port, the UE may apply the same synchronization to demodulation of the other antenna port.

Regarding average receive power, the UE may average the RSRP (Reference Signal Received Power) measurements of two or more antenna ports.

For example, suppose the DMRS antenna port for demodulation of downlink data channel becomes QC/QCL with the CRS antenna port of a serving cell. Then, the UE may apply large-scale properties of a radio channel estimated through the UE's CRS antenna port at the time of channel estimation through the corresponding DMRS antenna port in the same manner to improve the DMRS based downlink data channel receive performance.

This is possible because a CRS is a reference signal broadcast with a relatively high density for each subframe and over the whole frequency band, and an estimate for the large-scale property may be obtained from the CRS more reliably. On the other hand, since a DMRS is transmitted in a UE-specific manner for a specifically scheduled RB, and a PRG (Precoding Resource block Group) unit may change the precoding matrix used for transmission by the eNB, an effective channel received by the UE may change in PRG units, and thus even if a plurality of PRGs are scheduled, performance degradation may occur when the DMRS is used for estimation of large-scale property of a radio channel across a large frequency band. Also, since the transmission period of a CSI-RS may become a few to tens of milliseconds and has low average density for each resource block, 1 resource element per antenna port, performance degradation may also occur when the CSI-RS is used for estimation of large-scale property of a radio channel.

In other words, by assuming the QC/QCL relationship between antenna ports, the UE may use the assumption for detection/reception of a downlink reference signal, channel estimation, and channel state report.

Limited Measurement of RLM and RRM/CSI

In one method for interference coordination, time domain inter-cell interference coordination is possible, where an aggressor cell may use a silent subframe (which may also be called an ABS (Almost Blank Subframe)) that reduces transmission power/activity of part of physical channels (in this case, reducing transmission power/activity may include up to the operation of setting to zero power), and a victim cell schedules a UE by taking into account using the silent subframe.

In this case, in view of a UE belonging to a victim cell, interference level may change a lot according to subframes.

Considering the aforementioned situation, to perform Radio Resource Management (RRM) operation measuring more accurate radio link monitoring (RLM) or RSRP/RSRQ in each subframe or measure Channel State Information (CSI) for link adaptation, the monitoring/measurement has to be limited to the sets of subframes exhibiting uniform interference property. The 3GPP LTE system defines limited RLM and RRM/CSI measurement as described below.

The UE monitors downlink link quality based on a cell-specific reference signal (CRS) to detect downlink link quality of a Pcell. The UE estimates downlink link quality and compares a threshold Q_out and Q_in with the estimate to monitor downlink link quality of the Pcell.

The threshold Q_out is defined as the level at which downlink transmission may not be received reliably and corresponds to 10% Block Error Rate (BER) of hypothetical PDCCH transmission that takes into account a PCFICH error based on the transmission parameter described in Table 6 below.

The threshold Q_in is defined as the level at which downlink transmission may be received far more reliably than the transmission with downlink link quality at Q_out and corresponds to 2% BER of hypothetical PDCCH transmission that takes into account a PCFICH error based on the transmission parameter described in Table 7 below.

When upper layer signaling indicates a specific subframe for limited RLM, radio link quality is monitored.

When a time domain measurement resource limit pattern for performing RLM measurement is configured by the upper layer, and the time domain measurement resource limit pattern configured for a cell being measured indicates at least one subframe for each radio frame for performing RLM measurement, a predetermined requirement is applied.

In case CRS assistance information is provided, when the number of transmit antenna ports of one or more cells for which CRS assistance information is provided differs from the number of transmit antenna ports of a cell in which RLM is performed, the requirement may be satisfied.

If the UE does not receive the CRS assistance information or CRS assistance data are not valid over the whole evaluation period, time domain measurement limit may be applied upon collision of ABS configured within the CRS and non-MBSFN (Multicast Broadcast Single Frequency Network) subframe.

Table 6 illustrates PDCCH/PCFICH transmission parameters in the out-of-sync status.

TABLE 6

| Attribute | Value |
| --- | --- |
| DCI format | 1A |
| Number of control OFDM symbols | 2: Bandwidth ≥10 MHz<br>3: 3 MHz ≤ Bandwidth ≤ 10 MHz<br>4: Bandwidth = 1.4 MHz |
| Aggregation level (CCE) | 4: Bandwidth = 1.4 MHz<br>8: Bandwidth ≥3 MHz |
| Ratio of PDCCH RE energy to average RS RE energy | 4 dB: The case where a single antenna port is used for CRS transmission by the Pcell<br>1 dB: the case where two or four antenna ports are used for CRS transmission by the Pcell |
| Ratio of PCFICH RE energy to average RS RE energy | 4 dB: The case where a single antenna port is used for CRS transmission by the Pcell<br>1 dB: the case where two or four antenna ports are used for CRS transmission by the Pcell |

Table 7 illustrates PDCCH/PCFICH transmission parameters for the out-of-sync status.

TABLE 7

| Attribute | Value |
| --- | --- |
| DCI format | 1C |
| Number of control OFDM symbols | 2: Bandwidth ≥10 MHz<br>3: 3 MHz ≤ Bandwidth ≤ 10 MHz<br>4: Bandwidth = 1.4 MHz |
| Aggregation level (CCE) | 4 |
| Ratio of PDCCH RE energy to average RS RE energy | 0 dB: The case where a single antenna port is used for CRS transmission by the Pcell<br>−3 dB: the case where two or four antenna ports are used for CRS transmission by the Pcell |
| Ratio of PCFICH RE energy to average RS RE energy | 4 dB: The case where a single antenna port is used for CRS transmission by the Pcell<br>1 dB: the case where two or four antenna ports are used for CRS transmission by the Pcell |

The downlink radio link quality with respect to the Pcell is monitored to indicate the out-of-sync status/in-sync status for the upper layer.

In the non-DRX mode operation, the physical layer of the UE assesses radio link quality evaluated during a previous period by taking into account the thresholds (Q_out and Q_in) at each radio frame.

If a specific subframe for RLM with limited upper layer signaling is indicated, measurement of radio link quality is not performed for other subframes other than the subframe indicated by the upper layer signaling.

If radio link quality is worse than the threshold Q_out, the physical layer of the UE indicates out-of-sync for the upper layer within a radio frame of which the radio link quality has been measured. If radio link quality is better than the threshold Q_in, the physical layer of the UE indicates in-sync for the upper layer within a radio frame of which the radio link quality has been measured.

Massive MIMO

A wireless communication system compliant with the LTE release 12 or later considers adopting an Active Antenna System (AAS).

Different from an existing passive antenna system of which the amplifier and the antenna capable of adjusting the phase and amplitude of a signal, an AAS refers to a system designed so that each antenna includes an active component such as an amplifier.

An AAS does not require a separate cable, connector, and other hardware components for connecting an amplifier to an active antenna, thereby providing a high efficiency in terms of energy use and operation costs. In particular, since an AAS supports an electronic beam control method for each antenna, it realizes an advanced MIMO technology that implements precise beam forming or generation of a 3-D beam pattern considering a beam direction and beam width.

Due to the adoption of an advanced antenna system such as the AAS, a massive MIMO structure having a plurality of input and output antennas and a multi-dimensional antenna structure is also considered. As one example, different from the existing straight line-type antenna arrays, in case a two-dimensional antenna array is formed, a 3-D beam pattern may be formed by using an active antenna of the AAS. In case the 3-D beam pattern is utilized in view of a transmit antenna, quasi-static or dynamic beam forming in the vertical direction as well as in the horizontal direction of the beam may be performed, and as one example, application of forming a section in the vertical direction may be considered.

Also, in view of a receive antenna, when a reception beam is formed by utilizing a massive receive antenna, a signal power boost effect due to an antenna array gain may be expected. Therefore, in the case of uplink transmission, an eNB may receive a signal transmitted from a UE through a plurality of antennas, and at this time, the UE may set its transmission power to be very low to reduce an interference effect by taking into account the gain of a massive reception antenna.

FIG. 11 illustrates a system in which an eNB or a UE is equipped with a plurality of transmit/receive antennas capable of AAS-based 3D (3-Dimensional) beam forming in a wireless communication system to which the present invention may be applied.

FIG. 11 depicts the aforementioned example, a 3D MIMO system employing a 2D antenna array (namely 2D-AAS) in particular.

Cell Coverage of Massive MIMO

A multi-antenna system, a system having N transmission antennas, for example, may perform beamforming so that reception power at a specific position becomes up to N times higher under an assumption that the total transmission power is the same as that of a single antenna system.

Even for an eNB having a multi-antenna system, a channel transmitting CRS, PSS/SSS, PBCH, and broadcast information does not perform beamforming in a specific direction for all of the UEs within a coverage area of the eNB to receive the information.

On the other hand, a PDSCH, a channel transmitting unicast information to a specific UE, improves a transmission efficiency by performing beamforming according to the position of the corresponding UE and link condition. In other words, a transmission data stream of the PDSCH is precoded for beamforming in a specific direction and transmitted through multiple antenna ports. Therefore, in a typical situation where the transmission power of a CRS is the same as that of a PDSCH, the reception power of a precoded PDSCH beamformed toward a specific UE may be increased up to N times of the average reception power of the CRS.

The recent LTE Rel-11 system considers an eNB having up to 8 transmission antennas, which indicates that the reception power of a precoded PDSCH may be 8 times larger than the CRS average reception power. However, in case 100 or more transmission antennas are used for an eNB due to introduction of a massive MIMO system in a future, the reception power of CRS and precoded PDSCH may be 100 times or more different. As a result, due to introduction of a massive MIMO system, the coverage area of a CRS transmitted from a specific eNB may not be the same as the coverage area of a DM-RS based PDSCH.

In particular, such a phenomenon may occur frequently when the difference in the number of transmission antennas of two neighboring eNBs is large. In a typical example, a macro cell having 64 transmission antennas is adjacent to a micro cell having a single transmission antenna (for example, pico-cell). During an initial deployment of a massive MIMO system, since a served UE expects that a plurality of macro cells first increase the number of antennas, the number of transmission antennas of neighboring eNBs exhibits a large difference in a heterogenous network in which a macro cell, micro cell, and pico cell co-exist.

For example, in the case of a pico cell having a single transmission antenna, the coverage area of the CRS is the same as that of the PDSCH. However, in the case of a macro cell having 64 transmission antennas, the coverage area of the CRS is larger than that of the PDSCH. Therefore, if the initial access and handover are determined at the boundary of a macro cell and a pico cell according to the RSRP or RSRQ only, which is reception quality of a CRS, the eNB supposed to provide the highest quality of the PDSCH may not be selected as a serving cell. As a simple remedy to this situation, the PDSCH reception power of an eNB having N transmission antennas may be assumed to be N times larger; however, considering that the eNB may not perform beamforming in all possible directions, the remedy is not an optimal solution.

RRM-RS

The present invention proposes a method for transmitting a precoded RS and performing RRM measurement of the transmitted precoded RS. In what follows, the present document refers to the precoded RS of the aforementioned purpose as 'RRM-RS'. An RRM-RS comprises a plurality of antenna ports, and each antenna port is configured to have different beamforming from the others, thereby allowing a UE to measure RSRP for each transmission beam. As one example, the RRM-RS comprising M-ports is configured when an eNB is capable of beamforming in M directions.

Period of RRM-RS and Multiplexing

An M-port RRM-RS may be transmitted by being processed according to the CDM, FDM, or TDM scheme in the same subframe. In other words, when a transmission signal for each antenna port of the M-port RRM-RS may be transmitted in the same subframe by using a different transmission RE or transmitted by using the same RE, the transmission signal may be distinguished from the other by using an orthogonal scrambling code between antenna ports.

Different from above, the number of antenna ports of an RRM-RS that may be transmitted simultaneously from one subframe may be set to K, and the RRM-RS may be transmitted being divided over (M/K) subframes.

In this case, the configuration parameter of the RRM-RS includes the number of the total antenna ports M and the number of antenna ports that are transmitted simultaneously from one subframe K. The configuration parameter of the RRM-RS includes the RRM-RS transmission period P and the offset O. Here, the RRM-RS transmission period is defined as an interval of subframes transmitted by the RRM-RS. As an example, when P=10, O=5, M=64, K=32, the RRM-RS is transmitted in the subframes the subframe indices (SFIs) of which are 15, 25, 35, and so on. In the subframe of which the SFI=5, the RRM-RS of 31 is transmitted from the antenna port 0, the RRM-RS of 63 is transmitted from the antenna port 32 in the subframe of which the SFI=15, and the RRM-RS of 31 is again transmitted from the antenna port 0 in the subframe of which the SFI=25.

Differently from the above, the RRM-RS transmission period is defined as an interval of subframes in which an RS using the same antenna port is transmitted, and the RRM-RS is transmitted being divided over (M/K) consecutive subframes by using a method of allocating the RRM-RS antenna ports over (M/K) subframes. As an example, when P=20, O=5, M=64, K=32, the RRM-RS is transmitted in the subframes the SFIs of which are 5, 6, 25, 26, 45, 46, and so on. In the subframe of which the SFI=5, the RRM-RS of 31 is transmitted from the antenna port 0, the RRM-RS of 63 is transmitted from the antenna port 32 in the subframe of which the SFI=6, and the RRM-RS of 31 is again transmitted from the antenna port 0 in the subframe of which the SFI=25.

RSRP Measurement and Report

The RSRP of an RRM-RS is measured and reported for each antenna port. The UE may be configured to receive a plurality of RRM-RSs.

In case each cell transmits one RRM-RS, the UE may be configured to receive RRM-RSs transmitted by a serving cell and neighboring cells. One cell may transmit a plurality of RRM-RSs. When reporting the RSRP of an RRM-RS, the UE also reports from which antenna port of which RRM-RS the measurement of the corresponding RSRP results.

To calculate the RSRP of the RRM-RS, received signal level of each antenna port is averaged, where the RSRP is obtained by taking the average over a time window specified by the eNB or by averaging the received signal level for each antenna port of the RRM-RS over a predetermine period (for example, 200 ms). Likewise, the average received power obtained from each individual time window may be filtered again to obtain the RSRP to be reported.

The UE configured for a plurality of RRM-RSs measures RSRP for each antenna port of the respective RRM-RSs. In case the UE is configured for R RRM-RSs, and the number of antenna ports of the r-th RRM-RS is M_r, the RSRP of the m-th antenna port of the r-th RRM-RS is defined to be RSRP(r, m). The UE arranges the RSRP(r, m); and among them, selects and reports the RSRP of L antenna ports received a with strong signal strength.

By slightly modifying the method above, the UE arranges RSRP(r, m), selects an antenna port received with the strongest signal strength among them, and reports only the RSRP of antenna ports falling within a predetermined difference from the RSRP of the selected antenna port, namely max(RSRP(r, m)). In other words, by using the expression below based on an RSRP ratio or dB scale, the UE reports the RSRP of up to L antenna ports of which the difference in RSRP is higher than a predetermined threshold.

$$RSRP(r,m)-\max(RSRP(r,m)) > \text{Threshold} \quad [\text{Eq. 13}]$$

As another example, a reference antenna port may be assigned to the UE. Regarding the reference antenna port, it is preferable to assign an antenna port of the RRM-RS transmitted by a serving cell of which the beam direction is similar to the precoded CSI-RS configured for the corresponding UE. In case m_0-th antenna port of the r_0-th RRM-RS is assigned to the UE as a reference antenna port, the UE reports when the RSRP of the other antenna port falls within a predetermined difference from the RSRP of the reference antenna port. In other words, as expressed below, the UE reports when the difference of RSRP exceeds a predetermined threshold in terms of an RSRP ratio or dB scale.

$$RSRP(r,m)-RSRP(r\_0,m\_0) > \text{Threshold} \quad [\text{Eq. 14}]$$

FIG. 12 illustrates RSRP for each antenna port of an RRM-RS according to one embodiment of the present invention.

FIG. 12 illustrates one example of RSRP for each antenna port of an RRM-RS comprising 32 antenna ports.

As shown in FIG. 12, in case antenna ports with RSRP falling within 5 dB compared with an antenna port having the maximum RSRP is configured to report RSRP, an antenna port having RSRP exceeding 35 dB is reported since antenna port 13 exhibits the maximum RSRP of 40 DB. In other words, including the antenna port 13, RSRP of antenna port 24, 25, and 26 is reported to the eNB.

Antenna Port Grouping

Beamforming may be configured differently for each antenna port, and in such a case, an antenna port and a beam has one-to-one correspondence.

Therefore, an antenna port index (i) may be one-to-one mapped to a beam index (i). In case beams are indexed so that the direction of the (i)-th beam is adjacent to that of the (i+1)-th beam, the RSRP of neighboring antenna ports exhibits similar characteristics to each other as shown in FIG. 12. This similarity is also observed between the (i)-th beam and the (i+1)-th beam, the similarity becomes low as c is increased. Whether a high similarity is preserved among several consecutive neighboring beams is determined by beam spacing, beam width, and degree of scattering among multi-paths.

The eNB receiving a report about an RSRP measurement result based on the RRM-RS figures out an approximate position of the UE and informs the UE of the configuration for a precoded CSI-RS transmitted toward the corresponding position, thereby allowing the UE to measure the CSI-RS and providing CSI (RI, PMI, CQI, and so) for PDSCH scheduling as feedback information. Also, the eNB receiving a report about an RSRP measurement result based on the RRM-RSs transmitted from a plurality of cells determines to which cell the corresponding UE is to be handed over based on the RSRP measurement result and which precoded CSI-RS to be configured for the UE in a target cell. In other words, the RSRP measurement result based on the RRM-RS provides the eNB with important information required to determine which precoded CSI-RS to be configured for the corresponding UE afterwards.

In case the corresponding UE is allowed to transmit up to four data streams by using the RSRP measurement result as shown in FIG. 12 or 4-port CSI-RS is configured to perform the best beam switching quickly according to the change of fading, an optimal approach is to have an 4-port CSI-RS in the same directions as the beam directions of the RRM-RS port 13, 24, 25, 26 of which the RSRP exhibits the largest value generated and set. However, overhead is too significant to generate and transmit the CSI-RS optimized for each UE. Therefore, an immediate remedy to reduce the CSI-RS transmission overhead is to share the CSI-RS among UEs belonging to the same environment. To achieve this goal, precoding of CSI-RS antenna ports within one CSI-RS configuration has to be conducted to exhibit characteristics of beams transmitted in an adjacent direction. In other words, in case a 4-port CSI-RS1 in the same direction as the beam directions of the RRM-RS port 12, 13, 14, 15 and a 4-port CSI-RS2 in the same direction as the beam directions of the RRM-RS port 24, 25, 26, 27 are set in advance by taking into account other serviced UEs, an RSRP report based on the RRM-RS has to be used to determine which CSI-RS has to be configured for the corresponding UE.

In another embodiment of the present invention, RSRP is measured and reported with respect to an antenna port group. In the proposed method, antenna ports are grouped, and the RSRP of the corresponding antenna port group is obtained by taking an average of the RSRPs of the antenna ports belonging to the group. The group is predetermined, or the eNB may determine the group. Or the UE may determine and report a grouping method.

As shown in FIG. 12, in the case of an RRM-RS comprising 32-ports, the antenna ports may be grouped by four ports. The groups may be disjointed to form 8 (=32/4) groups. In this case, the (i)-th port group comprises an RRM-RS port (4i), (4i+1), (4i+2), and (4i+3). The RSRP of the (i)-th port group is defined as an average of the RSRP of antenna port (4i), (4i+1), (4i+2), and (4i+3).

In a yet another embodiment, grouping may be performed by using overlap between groups. In case an RRM-RS comprising 32 ports is grouped by four ports, the antenna ports may be grouped to form 15 groups. In this case, the (i)-th port group comprises RRM-RS port (2i), (2i+1), (2i+2), and (2i+3). Generalizing this method, if it is configured so that antenna ports are grouped by A ports, and the port spacing between neighboring groups is set to B, the (i)-th port group comprises RRM-RS port (B*i), (B*i+1), ..., (B*i+A−1). The eNB may set the parameters of A and B for the UE, or the UE may choose and report the parameters by taking into account the channel environment and UE capability.

As a modification to the method for the UE to select an antenna port group to report, capability information obtained from the corresponding antenna port group may be preferred to the RSRP. In this case, the UE calculates the capability by taking into account multi-layer data transmission from a plurality of antennas within an antenna port group.

Antenna Port Grouping Level

The proposed method may use a method using groups of different sizes. In other words, a method of grouping by A1 ports and a method of grouping by A2 ports may be used simultaneously. In what follows, a method of grouping by A_i ports will be called a grouping level i.

FIG. 13 illustrates an RRM-RS antenna port grouping level according to one embodiment of the present invention.

FIG. 13 illustrates one example of grouping a 16 port RRM-RS by applying four-step grouping levels. In the example, the grouping level 1 employs a method for grouping by 1 port which actually does not apply grouping. And grouping level 2, 3, and 4 correspond to grouping by 2, 4, and 8 ports, respectively. In the example, the antenna port groups at the same level is configured to be disjoint with each other.

In the multi-grouping method, the UE reports RSRP for each grouping level. In other words, the UE selects an antenna group exhibiting high RSRP at each grouping level and reports the selected antenna group. Or the UE may compare RSRPs among different antenna groups and may report the best group and the corresponding group level. To compare RSRPs of antenna groups different from each other by one level, group RSRP of each level is compensated by a predetermined offset and then compared with each other. In case R RRM-RSs are configured, if the RSRP of the (g)-th antenna port group of the (l)-th grouping level of the (r)-th RRM-RS is defined as GRSRP(r, l, g), the RSRP is compensated with the offset(r, l) specified by the eNB for the (l)-th grouping level of the (r)-th RRM-RS as shown below. Adj_GRSRP(r, l, g) is then calculated and used for comparison.

$$\text{Adj\_GRSRP}(r,l,g) = \text{GRSRP}(r,l,g) + \text{offset}(r,l) \qquad [\text{Eq. 15}]$$

In addition, for each grouping level or in a whole grouping method, to reduce frequent change with respect to the best L reported by the method for reporting the best L port group RSRP, a hysteresis parameter, Hy may be added to compensate the RSRP.

$$\text{Adj\_GRSRP}(r,l,g) = \text{GRSRP}(r,l,g) + \text{offset}(r,l) \pm Hy \qquad [\text{Eq. 16}]$$

Here, according to whether the corresponding port group belongs to the best L GRSRP in a previous report, it is determined whether to add or subtract Hy. In case the corresponding port group belongs to the best L GRSRP in a previous report, Hy is added to provide a bias so that Adj_RSRP has a high value. The Adj_RSRP prevents a port group having the best L Adj_GRSRP from being changed frequently.

By using the proposed method, a reference antenna port group may be configured for the UE. It is preferable for the eNB to specify an antenna port group of the RRM-RS transmitted by a serving cell of which the beam direction is the same as the beam direction of the precoded CSI-RS configured for the corresponding UE as a reference antenna port group. A reference antenna port group may be specified for the UE at each grouping level. Or one reference antenna port group may be specified from the entire grouping levels. In case the m_0-th antenna port group of the l_0-th grouping level of the r_0-th RRM-RS is specified for the UE as a reference antenna port group, the UE makes a report when the Adj_GRSRP of the other antenna port group exceed a predetermined threshold compared with the Adj_GRSRP of the reference antenna port group. In other words, as shown below, the UE reports if a difference of RSRP in terms of Adj_GRSRP ratio or dB scale exceeds a predetermined threshold.

$$\text{Adj\_GRSRP}(r,l,g) - \text{Adj\_GRSRP}(r\_0, l\_0, m\_0) > \text{Threshold} \qquad [\text{Eq. 17}]$$

Or a modification of the proposed method specifies reference RSRP by using a currently set CSI-RS, compares the RRM-RS based RSRP result with the CSI-RS based RSRP, and reports a selected result.

3D RRM-RS

The proposed method above according to the present invention may be modified to be applied to the case in which directivity of a beam is extended from 2D space to 3D space. In the 3D space, the beam directivity is adjusted by two angular positions comprising an up-down angle (vertical angle) and a left-right angle (horizontal angle). Therefore, in order to detect an adjacent beam efficiently, beams are required to be indexed with two indices, namely a horizontal index and a vertical index. To develop an one-to-one relationship between a beam index and an RRM-RS port index according to the present invention, it is preferable that the RRM-RS port is also indexed with a horizontal and vertical indices.

In the case of 3D MIMO system having M_v beams in the vertical direction and M_h beams in the horizontal direction, a total of (M_v×M_h) beams may be generated. In the present invention, an (M_v×M_h)-port RRM-RS is assumed, and a horizontal index j_h (j_h=0, ..., M_h−1) and a vertical index j_v (j_v=0, ..., M_v−1) are assigned to each antenna port. Each individual antenna port receives a one-dimensional index i (i=0, ..., M_v×M_h−1) and a two-dimensional index j_h and j_v by taking into account the resource mapping of the (M_v× M_h)-port RRM-RS, and a relationship of (i)=f(j_h, j_v) is established.

FIG. 14 illustrates antenna ports of RRM-RS arranged with two-dimensional indices and antenna port groups according to one embodiment of the present invention.

Referring to FIG. 14, each antenna port is indexed in the form of (j_h, j_v). If the antenna ports are grouped by A_h×A_v ports, and the port spacing between neighboring groups is set to B_h and B_v according to the method of the present invention, the (i_h, i_v)-th port group comprises RRM-RS ports (B_h× i_h+j_h, B_v× i_v+j_v), (j_h=0, . . . , A_h−1), (j_v=0, . . . , A_v−1). The parameter A_h, A_v, and B_h, B_v may be set for the UE or may be selected and reported by the UE after taking into account a channel environment and UE capability.

Difference Between RRM-RS and CSI-RS

The conventional LTE/LTE-A system transmits a CSI-RS for reporting CSI. The UE reports CSI including RI, PMI, and CQI. Differently from the above, the RRM-RS according to the present invention is used for measuring RSRP for each port. Instead of newly defining a transmission resource for an RRM-RS, it is preferable to use a resource that an existing CSI-RS may configure. This is so because legacy UEs do not degrade transmission efficiency. In case an RRM-RS is transmitted to a new resource, legacy UEs is unable to recognize the RRM-RS; thus transmission efficiency may be degraded or scheduling may not be performed in the subframe to which the RRM-RS is transmitted. Therefore, a method for transmitting an RRM-RS by using a resource that may be configured by the existing CSI-RS may perform CSI-RS configuration by using the corresponding resource for the legacy UEs and inform them that data are not mapped to the corresponding resource.

Data are not mapped to a plurality of CSI-RSs configured for CSI reporting to the UE. In other words, a PDSCH is mapped excluding an RE to which a CSI-RS is mapped. According to the method of the present invention, an RRM-RS may be used to map a PDSCH to REs except for those REs to which the RRM-RS is mapped in the same way as a CSI-RS is used. However, a modified method of the present invention may be used to map the PDSCH irrespective of the RRM-RS. In this case, the UE has to be capable of receiving both RRM-RS and PDSCH by using the same RE. Or in order to ensure that the eNB receive the RRM-RS in a reliable manner, the corresponding resource may be set as a ZP-CSI-RS so that the PDSCH may not be mapped.

QCL Configuration of RRM-RS

In case each cell transmits an RRM-RS, the UE may obtain configuration of RRM-RSs that a serving cell and neighboring cells transmit. By using the configuration, the UE measures a gain due to beamforming of the serving cell and a gain due to beamforming of neighboring cells, and reports the measured gains to a network, and allows the measured gains to be used as a criterion for determining whether to perform handover. Since an RRM-RS is set to have a considerably low transmission density, the RRM-RS may not be sufficient to be used for signal tracking. Therefore, a CRS, which is a typical signal that is received reliably due to its high density, is used for tracking, and the tracking result is utilized to detect an RRM-RS. In other words, it is irrelevant to use a tracking result obtained by the CRS of a serving cell by utilizing an error of the oscillator generating carrier frequencies of the serving cell and neighboring cell for the RRM-RS transmitted from the neighboring cell. Therefore, for each RRM-RS, QCL (Quasi Co-Located) CRS (or other specific RS such as a CSI-RS) to be used for detecting the RRM-RS is informed. The UE uses large-scale properties of a channel estimated from the QCL CRS (or other specific RS such as a CSI-RS) for detection of a RRM-RS. Here, the large-scale properties of a channel may include at least one or more of delay spread, Doppler spread, Doppler shift, average gain, and average delay.

Extension to RSRQ

The proposed methods of the present invention may be extended to measure RSRQ for each antenna port of an RRM-RS. RSRQ is defined as a ratio of RSRP to RSSI. Therefore, RSRQ involves additional measurement of RSSI. Resources for measuring RSSI may be configured in the same manner for all of the RRM-RSs having the same carrier frequency, namely the same component carrier. In this case, comparison among ports of RRM-RSs within the same component carrier based on either RSRP or RSRQ yields the same result. However, in the case of using heterogeneous component carriers, comparison among ports of RRM-RSs gives a different result depending on whether RSRP or RSRQ is used. Therefore, the eNB specifies which one of RSRP and RSRQ to use for the UE performing an RRM report based on an RRM-RS.

Differently from the method above, RSSI measurement resources may be set separately for each individual RRM-RS. In this case, even within the same component carrier, comparison among ports of RRM-RSs gives a different result depending on which one of RSRP and RSRQ to use. Therefore, the eNB specifies which one of RSRP and RSRQ to use for the UE performing an RRM report based on an RRM-RS.

Relationship Between RRM-RS RSRP and CRS RSRP

The RSRP based on an RRM-RS according to the present invention is intended to reflect a beamforming gain of the eNB having multiple antennas to select a serving cell. Suppose beamforming of a specific neighboring cell is regarded as being the best in terms of the RSRP of an RRM-RS. If channels broadcast from the corresponding cell, namely the channels performing CRS-based demodulation are not received reliably, however, the UE may not be handed over to the corresponding neighboring cell. Therefore, report from the UE has to be received about whether both RRM-RS and CRS transmitted from a specific eNB provide good quality, and handover and beam selection have to be performed according to the report. To this purpose, while reporting RSRP of the j-th antenna port or port group of the i-th RRM-RS set to the UE, the UE is made to also report the RSRP of the CRS connected to the i-th RRM-RS. Here, the CRS related to the RRM-RS may be the CRS quasi co-located (QCL) with the RRM-RS.

Improved RRM and RLM Operation

When an FD-MIMO system is used, a user located at the cell-edge may experience significant performance degradation due to using a conventional cell association method. Also, because of a coverage hole of the CRS/PDCCH generated by a narrow vertical beam, the width of a vertical beam of CRS/PDCCH may exert a considerable effect on the system throughput, leading to performance degradation. If CRS virtualization is used for the FD-MIMO system, it may incur irrelevant cell association of the UE at the cell edge in terms of system performance, in particular. Since the FD-MIMO scheme operates with a beam gain higher than that for a conventional transmission scheme, the UE has to be attached to the cell that may provide an optimal vertical beam applied to the PDSCH for the corresponding UE.

In other words, to perform the FD-MIMO operation, the UE has to be attached to the cell capable of providing an optimal vertical beam applied to the PDSCH with respect to the corresponding UE.

In a situation where the UE is attached to a cell in advance, the FD-MIMO operation may be performed through RRM measurement based on a CSI-RS (DRS-CSI-RS when used as a discovery RS (DRS)). More specifically, the UE (supporting the FD-MIMO operation) is attached to a cell according to an existing CRS-based cell selection procedure mostly including the RACH procedure even if the cell is not the best cell in view of the aforementioned FD-MIMO operation. If the UE is set up for the RRC-Connected mode, all of the upper layer signaling required for a discovery procedure including DRS measurement timing configuration (DMTC) and DRS-CSI-RS configuration need to be configured for the UE. According to the configuration, the UE measures the DRS-CSI-RS periodically according to the period set in the DMTC (for example, 40, 80, or 160 ms).

In particular, the UE may perform CSI-RS based RRM report according to a specific operation based on the RRM measurement based on the DRS-CSI-RS (for example, a case in which separate vertical beams are applied during the FD-MIMO operation). The eNB collects the RRM report result, and if the eNB determines that the current serving cell of the corresponding UE does not provide the UE with an optimal vertical beam applied to the PDSCH transmitted by the FD-MIMO mode operation, the eNB may command the UE to hand over to other cell. In other words, an optimal RRM result may be derived and reported based on a specific DRS-CSI-RS transmitted from a different cell other than a serving cell.

The CSI-RS precoded together with the DRS may be used for RRM including selection of an optimal vertical beam as well as determination of potential handover for the UE supporting the FD-MIMO operation.

However, to support the FD-MIMO operation more efficiently, designing an RS purely for the purpose of RRM measurement may be considered.

Since the current DRS-CSI-RS is transmitted only from the antenna port 15, individual DRS-CSI-RS configuration corresponding to each vertical beam different for each cell has to be set up for the UE. However, to take into account the purpose of RRM to support the FD-MIMO operation and to still maintain the CDM among antenna ports within the CSI-RS configuration (for example, antenna port 15 and 16) to improve the efficiency of resource utilization, multiple CSI-RS antenna ports applied to the respective vertical beam directions within the same cell may be set up by a single CSI-RS configuration. Also, other configuration and operation required for a discovery procedure, including DRS occasion related to the configurations, may be omitted for the purpose of the RRM.

Therefore, separate RSs for the RRM purpose are required to support the FD-MIMO operation.

If the aforementioned latency caused during association with a cell capable of providing an optimal vertical beam applied to the PDSCH for the UE is taken into account, a method for reducing such latency also requires a method for associating with an optical cell even when the UE is in the initial access stage.

More specifically, according to a conventional cell association behavior, the worst-case latency may result from the UE's receiving RRC signaling including the DMTC related to the discovery procedure, the UE's performing long-term DRS-CSI-RS measurement and report according to the configured RRC signaling, and the UE's handing over to other cell in case the UE is found to be attached to other cell that is not optimal in terms of FD-MIMO operation.

Accordingly, improvement of a cell selection/reselection procedure for the UE supporting the FD-MIMO operation may be considered so that the UE may start searching for the best cell when the UE is in the idle mode.

Also, radio link monitoring operation has to be improved in view of association with the best cell by the UE being serviced from FD-MIMO transmission.

Therefore, a method for reducing potential latency that may be caused while the UE supporting the FD-MIMO operation is being associated appropriately with the best cell is required.

RRM-RS Based Cell Selection Method

The UE may assist the eNB to determine UE association by reporting beamformed RS ports in a specific direction like the RRM-RS described above or RRM measurement (for example, RSRP or RSRQ) based on different RS ports in an amorphous cell environment (comprising a different number of TP(s)/cell(s)) to the eNB.

Here, an amorphous cell refers to a cell that does not have a fixed cell form but is arbitrarily shaped from the distribution of UEs. In other words, without forming a fixed cell type, the amorphous cell builds up coverage by transmitting data to the UEs through cooperation among dense (small) cells. Therefore, if the UE moves, a cell to which the UE has moved is considered to minimize handover.

In other words, in order to perform a series of the aforementioned operations, the UE has to access a specific cell through an initial access process such as the existing random access procedure (namely RACH procedure) and has to receive various types of prior information including the RRM-RS related configuration information from RRC signaling while the UE is in the RRC-connected state. Afterwards, the UE performs up to the operation of reporting various RRM measurements to the eNB according to the various RRM reporting procedure described above. Afterwards, by performing/determining best cell selection/handover processes, the eNB may hand over the corresponding UE if needed or determines the best TP (Transmission Point) to set the CSI-RS configuration. As a result, if it is found through a series of the aforementioned operations that the UE's best serving-cell is not the serving cell accessed in the initial access process, handover may inevitably performed. Therefore, in the case of a UE handed over to other cell in the initial access phase through the process described above, unnecessarily large latency may be caused from best cell association.

As another example of a limitation of using the conventional method, the Release-12 system utilizes a discovery procedure due to small-cell enhancement to set up an RS forming the role of the RRM-RS (for example, a discovery signal, Discovery Reference Signal (DRS), or DRS-CSI-RS) (in what follows, it is called DRS for the convenience of description) and configures DRS-based measurement related information including DRS Measurement Timing Configuration (DMTC). And through the aforementioned operation, a method that may be utilized for best UE-centric cell selection in the full-dimensional MIMO (FD MIMO) use case or advanced amorphous environment may be devised.

DMTC may be provided to the UE through an upper layer message (for example, RRC message). DMTC may include DRS transmission period/offset, measurement frequency band, measurement interval (in other words, discovery signal occasion), and DRS antenna port information.

More specifically, small cell enhancement maintains on-state of small cells only when the UE is located within the small cell coverage to save energy of the small cell and to reduce interference into neighboring cells; otherwise, the small cell enhancement supports a small cell on/off mechanism maintaining the off-state of the small cell. In this case, a discovery procedure is needed for the UE so that the small cell may determine on/off-state. To this purpose, the small cell always transmits (namely broadcasts) a DRS irrespective of the on/off-state. In other words, even when the small cell is in the off-state, the small cell broadcasts a DRS at a predetermined period. The predetermined period may be called a measurement period or DRS measurement timing configuration (DMTC) period, the example of which includes 40 ms, 80 ms, and 160 ms.

At this time, the small cell may maintain the on-state in which a DRS is broadcast for a predetermined period (for example, one to five subframes). For example, in case the measurement period is 40 ms, the small cell may broadcast a DRS for 6 ms while maintaining the on-state and may maintain the off-state for the remaining 34 ms. The time interval in which a DRS is transmitted as described above may be called a measurement window or DRS occasion. In other words, the DRS occasion may be an interval consisting of consecutive subframes (for example, an interval consisting of 1 (or 2) to 5 consecutive subframes) and one DRS occasion may be defined once within each measurement period (or DMTC period).

The UE performs measurement based on the DRS received from a small cell and transmits a measurement report to the eNB (or network). In this manner, by having the UE always measure a DRS transmitted from the small cell independently of whether the small cell is in the on or off-state and report the measurement result to the eNB (or network), the eNB (network) may figure out the most efficient small cell around the corresponding UE. For example, if the eNB (network) receives a measurement report from the UE and finds that DRS reception power of the small cell in the off-state or the DRS reception power of the UE is large, the eNB may change the state of the corresponding small cell to the on-state.

However, in this case, too, the UE first of all has to receive configuration information related to small cell discovery, such as DMTC, through RRC signaling in the RRC-connected state after being attached to a specific serving cell according to an existing method and to perform a plurality of CSI-RS-RSRP reports (namely DRS-based RSRP report) with respect to (precoded) DRSs (each of the DRSs may be directed in a separate FD-MIMO beam direction or transmitted from TPs comprising different amorphous cells). Then, based on the preceding operations, the eNB has to hand over the corresponding UE to a cell even though the cell is not the best cell in terms of CRS-based RSRP but may be regarded as the best cell in terms of FD-MIMO or amorphous cell. As a result, this method may also increase latency a lot until the UE is associated with the best cell (for example, since some UE has to go through the whole process comprising RRC connection→reception of DMTC related RRC information→long term DRS-CSI-RS measurement and report→handover procedure).

Therefore, like the FD-MIMO or amorphous cell environment, the present invention proposes a method for a UE to perform specific RRM measurement (for example, RSRP or RSRQ) by using a separate port for an RS (for example, RS for RRM measurement or RS for cell selection/reselection) different from the conventional RS transmitted in a cell-specific manner and/or a method for the UE to select or reselect the best cell based on RRM measurements by taking into account the best transmission mode to be configured for the UE in advance even when the UE is in the RRC idle (RRC_IDLE) mode at the initial access phase and/or a method for the UE to initiate the initial access process to the selected best cell. Also, the UE may perform the initial access process by performing the methods proposed according to the present invention in a sequential manner.

In what follows, in describing the present invention, the RRM-RS refers collectively to an RS transmitted in a locally different direction in the form of a sharp beam such as the one in the FD-MIMO transmission, an RS transmitted through different antenna ports for the respective TPs (or cells) disposed over distributed regions, and an RS for separate RRM measurement and report different from a cell-specific reference signal (CRS) (for example, CSI-RS and DRS).

1. Initial Cell Search Process of UE

As the first step of the initial access process according to the present invention, the UE may perform the initial cell search process.

In the initial cell search process, the UE may detect a specific synchronization signal such as the Primary Synchronization Signal (PSS) and Secondary Synchronization Signal (SSS) that each cell transmits in the same way as in the conventional method and obtain a Physical (layer) Cell ID (PCI) used by the corresponding cell.

According to a specific sequence of PSS and SSS, the UE may obtain the PCI. In other words, a total of 504 unique PCIs may be expressed from a combination of 3 PSSs and 168 SSSs.

In other words, the PCIs are grouped into 168 PCI groups each of which includes 3 unique identifiers so that each PCI belongs to only one PCI group. Therefore, PCI $N\_ID^{cell}=3N\_ID^{(1)}+N\_ID^{(2)}$ is defined uniquely by the number $N\_ID^{(i)}$ ranging from 0 to 167 representing PCI groups and the number $N\_ID^{(2)}$ ranging from 0 to 2 representing the PCI within the PCI group.

The UE may learn one of the three unique PCIs within a specific PCI group by detecting the PSS and identify one of the 168 PCI groups related to the PCI by detecting the SSS.

And by using the corresponding PCI detected, the UE may perform verification of cell ID by attempting to detect a CRS transmitted from the corresponding cell.

2. System Information Acquisition Process in a Searched Cell

The UE obtains various types of system information transmitted on the corresponding channel by reading PBCH (Physical Broadcast Channel), PDSCH (Physical Downlink Shared Channel) transmitted by a cell.

System information may be divided into MIB (Master Information Block) and a plurality of SIBs (System Information Blocks). In what follows, the SIB type x (System-InformationBlockTypex) is simply called 'SIB x'.

The UE uses a system information acquisition procedure to obtain system information broadcast by a network. The system information acquisition procedure is applied to both of a UE in the RRC_IDLE mode and a UE in the RRC_CONNECTED mode. For example, the UE may initiate the system information acquisition procedure when the UE encounters a different RAT (Radio Access Technology) after cell selection (for example, when the UE is power up), cell reselection, and handover, when the UE comes into the coverage from the outside of the coverage, when the UE receives notification that system information has been changed, or when maximum validity duration is exceeded.

First, the UE receives an MIB from the network. At this time, the MIB is transmitted from a physical channel PBCH. The MIB is scheduled at the subframe #0 of a radio frame of which the system frame number (SFN) mod 4=0 and is repeated at the subframe #0 of all of the other radio frames within the corresponding period. And the MIB occupies 72 central subcarriers within the first 4 OFDM symbols of the second slot of the subframe #0 of a radio frame.

The UE receives SIB 1 from the network by using the parameter received from the MIB. And the UE receives SIB x in addition to the SIB 1 from the network by using the scheduling information list (schedulingInfoList) obtained from the SIB 1.

The SIB 1 is scheduled at the subframe #5 of a radio frame of which the SFN mod 8=0 and is repeated at the subframe #5 of all of the other radio frames of which the SFN mod 2=0 within a period of 80 ms. Meanwhile, the remaining SIB except for the SIB 1 is transmitted by being mapped to the system information (SI) for each SIB having the same transmission period.

All of the SIBs are transmitted from a physical channel PDSCH. The PDCCH for an SIB transmits DCI to which a CRC scrambled with SI-RNTI (System Information RNTI) is attached, and a PDSCH transmitting an SIB is identified by the PDCCH.

By decoding the SI-RNTI on the PDCCH, the UE may obtain specific time/frequency resource area scheduling of the PDSCH transmitting an SI message. One SI-RNTI is used for addressing all of SI messages as well as the SIB 1.

The UE may overwrite the pre-stored system information with the system information obtained through the system information acquisition procedure.

In what follows, the present invention proposes a method for transmitting system information such as the MIB or specific SIB X to the UE by including at least one of the following RRM-RS configuration related information in the system information. The proposed method will be described with reference to a related drawing.

FIG. 15 illustrates an RRM-RS based cell selection method according to one embodiment of the present invention.

Referring to FIG. 15, the eNB transmits system information including RRM-RS configuration information to the UE S1501.

As described above, in what follows, RRM-RS is a term assigned for the convenience of description and may be defined in various other names/modified terms that may be set in the same format of CSI-RS or in the format similar thereto.

RRM-RS configuration with PCI (and/or neighbor-cell list)

Not only the RRM-RS configuration information transmitted from the corresponding cell but also the RRM-RS configuration information transmitted from neighboring cells may be transmitted to the UE as system information. In other words, specific RRM-RS configuration(s) are associated with (or correspond to) a specific PCI, and the association information may be provided together. At this time, one or more RRM-RSs may be associated with (or correspond to) one PCI.

Here, the neighbor-cell list includes a PCI list of neighbor-cells. One example of a neighbor cell may be those cells belonging to the eNB site defined in a 1-tier scale area in the surroundings of the corresponding cell.

By using the RRM-RS configuration information, since the UE may obtain not only the RRM-RS antenna port information transmitted by the corresponding cell but also the RRM-RS antenna port information transmitted by neighboring cells by reading the system information, it may be helpful for searching the corresponding cell and the neighboring cells for the best RRM measurement.

Also, through specific PCI information associated for each RRM-RS provided according to the operation above, the UE may apply QCL (Quasi Co-Located) assumption among CRS ports generated from the corresponding RRM-RS port and the corresponding associated PCI. At this time, the large-scale properties of a radio channel for which the QCL assumption is applied may include at least one of Doppler shift, Doppler spread, average delay, delay spread, and average gain.

Also, since an average gain is different for each RS, QCL assumption is not applied to the average gain; the large-scale properties of a radio channel to which the QCL assumption is applied may include at least one of Doppler shift, Doppler spread, average delay, and delay spread.

More specifically, the large-scale properties of a radio channel to which QCL assumption is applied is limited only to Doppler shift and Doppler spread, and the UE may obtain frequency synchronization of the corresponding RRM-RS through the corresponding associated CRS. In this case, the UE may consider that time synchronization may be obtained without an external support.

Or, if the UE is defined or configured to perform only RRM measurement by using the RRM-RS, only the Doppler shift may have to be applied to the large-scale characteristics of a radio channel for which the QCL assumption may be applied.

Or if the UE has to have a support of a CRS to obtain time synchronization and performs only RRM measurement by using the RRM-RS, the large-scale properties of a radio channel to which the QCL assumption is applied may include Doppler shift and average delay, and synchronization obtained through the CRS may be applied for demodulation of the RRM-RS.

In the sentences related to the QCL assumption of the RRM-RS, "PSS and/or SSS" may substitute for the CRS and may be applied for all or part of the sentences. In other words, for demodulation of an RRM-RS, frequency and/or time synchronization obtained from the CRS may be applied and/or frequency and/or time synchronization obtained from PSS/SSS (associated together with the corresponding PCI) may also be applied. In other words, the UE may be configured or defined in advance so that the QCL assumption is satisfied for all or part of the specific {RRM-RS, CRS, PSS/SSS} associated with the corresponding PCI.

Configuration information such as information about the number of RRM-RS antenna ports for each RRM-RS configuration, RRM-RS antenna port mapping information, information related to the corresponding RRM-RS transmission period/offset and/or information related to transmission (frequency/time) resources, which is needed for the UE to measure the corresponding RRM-RS, is provided.

In other words, as described above, one or more RRM-RS configurations may be associated with (or correspond to) one PCI (namely, a cell), and configuration information required for measuring the corresponding RRM-RS for each RRM-RS configuration is provided.

If the RRM-RS is configured in such a way to reuse the DRS (or DRS-CSI-RS) in the small cell discovery process, the configuration information required for measuring the CSI-RS as a DRS such as the DMTC may also be transmitted by being included in the corresponding system information.

As described above, the corresponding RRM-RS related configuration information may be explicitly signaled but at the same time, part of the aforementioned RRM-RS related configuration information may be provided implicitly in such a way of implicit indication associated with the corresponding PCI detected from the "1. Initial cell search process of UE" described above. In other words, the system information has to include PCI as the RRM-RS related configuration information, and the UE may determine (or consider) the RRM-RS configuration information included in the system information as the RRM-RS configuration information associated with (or corresponding to) the PCI detected from the initial cell search process.

For example, the transmission (frequency/time) resource related information may be defined so that the position of a specific reference resource is fixed in advance according to the PCI. It should also be noted that one or more of the information about the number of RRM-RS antenna ports, RRM-RS antenna port mapping information, and the corresponding RRM-RS transmission period/offset related information may be implicitly mapped (namely fixed) according to the corresponding PCI.

However, it may be preferable that the information about the number of RRM-RS antenna ports or RRM-RS transmission period/offset related information is provided to each individual cell (namely for each PCI) as the system information described above. In this case, for example, if configuration information stating that 32 antenna port RRM-RSs are transmitted according to a period of 40 ms and an offset of 5 ms is provided as the system information, the "reference resource" position may be defined in advance to indicate a specific reference RE position within a specific subframe. In other words, for a mapping relationship in which 32 antenna ports are mapped sequentially starting from the reference RE position defined as a fixed position by the PCI, a rule may be defined in advance, and therefore, RS mapping positions about 32 antenna ports are all determined from the corresponding reference RE positions. At this time, if the RRM-RS transmission of 1-cycle may not be performed all within a single subframe but is transmitted through a few subframes, the reference resource position may be defined as the reference RE position applied to the first subframe.

The UE which has received the RRM-RS configuration information performs RRM measurement based on the RRM-RS configuration information. In other words, by using the RRM-RS configuration information, the UE may perform RRM measurement of multiple RRM-RS ports before transmitting (namely before starting a random access procedure) the RACH (namely PRACH).

3. Determination of a Preferred Cell by a UE According to RRM-RS Based Enhanced RRM Measurement FIG. 16 illustrates an RRM measurement method according to one embodiment of the present invention.

Referring to FIG. 16, the UE measures RRM (for example, RSRP and RSRQ) by using a Cell-specific Reference Signal (CRS) and/or RRM reference signal (RRM-RS) transmitted from the eNB S1601.

The UE selects a cell by using a CRS-based RRM measurement and/or RRM-RS based RRM measurement S1602.

The UE (re)selects a cell from among a cell searched through the initial cell search process, a serving cell of the UE (or the cell on which the UE is currently camping), a cell adjacent to the cell found by the UE, or a cell adjacent to the serving cell of the UE according to the CRS-based RRM measurement and/or RRM-RS based RRM measurement. Afterwards, the UE, if being in the RRC_IDLE mode, may perform the initial access process on the (re)selected cell or camp on the corresponding cell. Also, the UE, if being in the RRC_CONNECTED mode, may perform a handover process on the (re)selected cell.

More specifically, based on the RRM-RS related configuration information described above, the UE performs separate RRM measurement for multiple RRM-RS ports. As described above, the RRM measurement may be performed by including RRM-RSs transmitted by neighboring candidate cells as well as the RRM-RS transmitted by a single target cell.

For example, after performing RRM-RS based RRM measurement with respect to the RRM-RS set 1 and RRM-RS set 2 transmitted from cell 1 (PCI 1) and cell 2 (PCI 2), the UE identifies the RRM-RS port exhibiting the best RRM measurement (for example, RSRP and RSRQ) for each set.

And the UE may initiate an initial access (for example, RACH procedure due to transmission of RACH preamble) to the cell that has transmitted the RRM-RS showing the largest RRM-RS based RRM value (namely the best value). In other words, the UE may start the random access procedure (namely RACH procedure) by transmitting the RACH preamble to the corresponding cell. And the UE in the RRC_IDLE state, by selecting or reselecting the cell that has transmitted the RRM-RS exhibiting the largest RRM-RS based RRM value (namely the best value), may camp on the corresponding cell. Also, the UE in the RRC_CONNECTED cell may perform handover to the cell that has transmitted an RRM-RS exhibiting the largest RRM-RS based RRM value (namely the best value).

The UE in the RRC_IDLE state always has to select a cell with appropriate quality and to be ready for receiving a service through the cell. For example, the UE which has just powered up has to select a cell with appropriate quality to register for a network. If the UE in the RRC_CONNECTED state enters the RRC_IDLE state, the UE has to select a cell to stay when the UE becomes the RRC_IDLE state. As described above, a process for the UE to select a cell satisfying a condition to stay in a service ready state such as the RRC_IDLE state is called cell selection.

And after the UE selects a cell through the cell selection process anyhow, signal strength or quality between the UE and the eNB may change due to mobility of the UE or change of a radio environment. Therefore, in case the quality of a selected cell is degraded, the UE may select another cell that provides better quality. In case a cell is selected again as described above, it is common for the UE to select a cell exhibiting better signal quality than that of a currently selected cell. This process is called cell reselection.

In what follows, for the convenience of description, selection of an (initial access) target cell may be interpreted that the UE selects a cell for initiating the RACH procedure, the UE in the RRC_IDLE state selects or reselects a camping cell, or the UE in the RRC_CONNECTED selects a target cell to which handover is to be performed.

And not only the method for transmitting the RACH preamble (namely initiating the random access procedure) to the cell that has transmitted a specific RRM-RS exhibiting the best RRM-RS based RRM measurement but also a specific function (or rule) determining the best initial access target cell by comparing the RRM-RS based RRM measurement and the CRS-based RRM measurement together may be defined in advance or configured for the UE.

For example, in case where the CRS-based RRM measurement of the cell that has transmitted a specific RRM-RS exhibiting the best RRM-RS based RRM measurement is smaller (worse) than a threshold difference (namely Y dB) with respect to the CRS-based RRM measurement from other cell (for example, the largest CRS-based RRM measurement), a specific threshold value Y may be defined along with a condition (or rule) that the corresponding cell may not be a target cell. As described above, in case a cell that has transmitted a specific RRM-RS exhibiting the best RRM-RS based RRM measurement is excluded from being a target cell, the UE may select a cell exhibiting the next largest RRM-RS based RRM measurement. This is intended to prevent the UE from accessing the corresponding cell in case reception quality is excessively low with respect to transmission of a basic control channel (for example, PDCCH) of the corresponding cell.

As another example, the UE may determine the best target cell by applying a weighted average of the RRM-RS based RRM measurements and the CRS-based RRM measurements transmitted by the corresponding cell. In other words, the UE may select the cell exhibiting the largest weighted average of the RRM-RS based RRM measurements and CRS-based RRM measurements as a target cell.

At this time, the weights used for the weighted average may be defined in advance. Also, weights may be allowed to belong to a range somewhat for implementation of the UE, but performance verification by using a specific test vector may be performed at the time of testing the UE.

As another example, suppose CRS-based RRM measurements of the respective detected cells are arranged in the order of size. Now assume that the largest measurement is C1 (for example, measurement for PCI 7), the next largest measurement is C2 (for example, measurement for PCI 9), and then the measurements are arranged in the order of C3 (for example, measurement for PCI 6), C4 (for example, measurement for PCT 5) and so on. Then RRM measurements smaller than C4 that exceeds a threshold Y where C1-C4>Y may be excluded from being a target cell. In other words, a cell of which the difference from the largest CRS-based RRM measurement is smaller than or equal to (or less than) a threshold may be determined as a candidate for a target cell. Therefore, in the example above, each of C1, C2, and C3 corresponding to the CRS-based RRM measurements (cells having PCI 7, PCI 9, or PCI 6) may be considered as candidates for a target cell. And the UE may select the cell exhibiting the largest RRM-RS based RRM measurement as a target cell from among the target cell candidates.

According to the conventional operation, it is preferable for the UE to start the initial access to the PCI 7 cell having the value of C1. However, according to another embodiment of the present invention, by calculating the best RRM-RS based RRM measurement from among the RRM-RSs transmitted from the respective cells additionally with respect to C1, C2, and C3 values, the measurements may be further compared with each other.

For example, suppose that the best RRM measurement among the RRM-RSs transmitted from a PCI 7 cell exhibiting the value of C1 is R1, the best RRM measurement among the RRM-RSs transmitted from a PCI 9 cell exhibiting the value of C2 is R2, and the best RRM measurement among the RRM-RSs transmitted from a PCI 6 cell exhibiting the value of C3 is R3. And it is assumed that R2=max{R1, R2, R3}, and R2>R3>R1 if they are arranged in the order of magnitude.

At this time, as a result, a formal rule may be predetermined or configured for the UE as to which cell to start the initial access.

To this purpose, the threshold Y may be further subdivided into the form of $0<Y1<Y2<\ldots<Yn<Y$ in advance, or the subdivided threshold may be configured for the UE. For example, for the convenience of description, it is assumed that n=3. Then subdivided thresholds Y1, Y2, and Y3, which satisfy a condition where $0<Y1<Y2<Y3<Y$, may be predefined or configured for the UE Similarly, for comparison of the values of R1, R2, and R3, threshold values satisfying a relationship of $0<Z1<Z2<\ldots<Zm<Z$ may be predefined or configured for the UE. For example, for the convenience of description, it is assumed that m=3. Then subdivided thresholds Z1, Z2, and Z3, which satisfy a condition where $0<Z1<Z2<Z3<Z$, may be predefined or configured for the UE.

For example, only when a rule in the following form is satisfied, a specific operation may be defined, which allows the initial access to other cell rather than the PCI 7 cell exhibiting the best CRS-based RRM measurement.

In what follows, the aforementioned rule is illustrated.

(1) in case Ci of a specific cell i belongs to the range of $Y3 \leq C1-Ci<Y$, the corresponding cell i may be selected as the initial access target cell only when Ri with respect to the corresponding cell i satisfies that $0 \leq \max\_j \{Rj\}-Ri<Z1$.

(2) in case Ci of a specific cell i belongs to the range of $Y2 \leq C1-Ci<Y3$, the corresponding cell i may be selected as the initial access target cell only when Ri with respect to the corresponding cell i satisfies that $0 \leq \max\_j \{Rj\}-Ri<Z2$.

(3) in case Ci of a specific cell i belongs to the range of $Y1<C1-Ci<Y2$, the corresponding cell i may be selected as the initial access target cell only when Ri with respect to the corresponding cell i satisfies that $0 \leq \max\_j \{Rj\}-Ri<Z3$.

(4) in case Ci of a specific cell i belongs to the range of $0<C1-Ci<Y1$, the corresponding cell i may be selected as the initial access target cell only when Ri with respect to the corresponding cell i satisfies that $0<\max\_j \{Rj\}-Ri<Z$.

Referring to the equations above, an initial access target cell may be selected by using a difference between the best CRS-based RRM measurement and the CRS-based RRM measurement with respect to a measurement target cell and a difference between the best RRM-RS based RRM measurement and the best RRM-RS based measurement of the measurement target cell. In other words, if a difference between the largest CRS based RRM measurement and the CRS-based RRM measurement of a specific cell is relatively large, the corresponding cell may be selected as a target cell only when the difference between the largest RRM-RS based RRM measurement and the RRM-RS based RRM measurement of the corresponding specific cell is relatively small. On the other hand, if the difference between the largest CRS-based RRM measurement and the CRS-based RRM measurement of a specific cell is relatively small, the corresponding specific cell may be selected as a target cell even if the difference between the largest RRM-RS based RRM measurement and the RRM-RS based RRM measurement of the corresponding specific cell is relatively large. As a result, the UE may select a cell in which either of the CRS-based RRM measurement and the RRM-RS based RRM measurement is suitable as a target cell.

If a plurality of conditions (1), (2), (3), and (4) are satisfied, the UE may determine a cell exhibiting the highest Ri value as a target cell for the initial access and transmit the RACH preamble to the target cell. Also, the UE in the RRC_IDLE state may select or reselect the cell exhibiting the highest Ri value.

The rule described above is only an example, and the present invention is not limited to the example. In other words, an equation describing a specific condition, which determines the initial access target cell by taking into account CRS-based RRM values (namely C1, C2, C3, and so on) and RRM-RS based RRM values (namely R1, R2, R3, and so on) simultaneously, may be modified.

As described above, in case the initial access is initiated as the best target cell is determined according to the RRM-RS based RRM measurement only instead of determining the best target cell by taking into account the CRS-based RRM measurement together, a control channel such as a common control channel may be immediately utilized in a system (for example, a new-carrier type (NCT) system that does not have CRS and PDCCH) controlled only through a UE-dedicated control channel (for example, EPDCCH).

In this case, information related to EPDCCH configuration may be informed to the UEs in advance in the system information such as the SIB X (or at the initial stage of the RACH procedure). For example, through the system information, only the configuration information related to the distributed EPDCCH may be first provided to the UE. Afterwards, if it is reported to the UE that a specific RRM-RS seems to exhibit the best RRM measurement, the eNB provides the corresponding UE with configuration information related to a more optimal localized EPDCCH according to the report and allows control information to be transmitted by the localized EPDCCH.

4. Additional Enhancement Operation in the RACH Procedure

FIG. 17 illustrates a random access procedure according to one embodiment of the present invention.

In what follows, for the convenience of description, the random access procedure according to one embodiment of the present invention is described with respect to the portion showing a difference from the random access procedure of FIG. 8, and those not described below may be replaced with the corresponding portion of the random access procedure of FIG. 8.

1) Step 1 (RACH Preamble Transmission of the UE)

The UE determines a target cell transmitting the RACH preamble by applying at least one of the methods described in "3. Determination of a preferred cell by a UE according to RRM-RS based enhanced RRM measurement" and transmits the RACH preamble (namely first message) to the corresponding target cell (S1701).

At this time, the UE reporting RRM measurements (for example, RRM-RS based RRM measurement and/or CRS-based RRM measurement) during the RACH procedure may select the RACH preamble from a set of RACH preambles differentから that for legacy UEs so that the reporting UE may be distinguished from the legacy UEs. Accordingly, the eNB may determine whether the corresponding UE reports an RRM measurement during the RACH procedure from the RACH preamble set to which the RACH preamble received from the UE belongs. As described above, in case a UE reporting an RRM measurement within the RACH procedure and a legacy UE use different preamble sets, the eNB may transmit the RACH preamble set information from the system information. For example, the eNB may transmit RACH preamble set information for the UE that has performed RRM-RS based RRM measurement in the S1501 step of FIG. 15 and/or the legacy UE.

2) Step 2 (Reception of a Random Access Response (RAR) from the eNB)

The eNB transmits a response to the RACH preamble that the corresponding UE has transmitted through message 2 (namely RAR) (S1702).

In the present step, since the corresponding UE does not know the information about the enhanced UE (namely the UE which has performed RRM-RS based RRM measurement) capable of supporting the FD-MIMO operation, the eNB may provide the legacy UE with a message 2 response of the same form.

As described above, in case the UE transmitting the RRM measurement within the RACH procedure and legacy UE select the RACH preamble from different RACH preamble sets, the message 2 transmitted to the UE transmitting the RRM measurement within the RACH procedure may be different from the message 2 transmitted to the legacy UE. For example, in case the format of the message 2 is distinguished as described above, only the message 2 transmitted to the UE transmitting the RRM measurement within the RACH procedure may include a threshold Z to be described later. Also, the eNB may allocate time/frequency resources to the UE transmitting the RRM measurement within the RACH procedure by taking into account that the corresponding UE transmits message 3 including the RRM measurement to be described later.

3) Step 3 (UE's Transmission of L2 (Layer 2)/L3 (Layer 3) Message)

The UE transmits a uplink message (namely message 3) through the PUSCH in response to the RAR received from the eNB at the S1702 step (S1703).

At this time, in the S1702 step, the PUSCH may be transmitted through the (temporal) C-RNTI received through the RAR from the eNB.

According to one embodiment of the present invention, the UE may report the RRM measurement measured by using a reference signal to the eNB through the message 3. At this time, the RRM measurement may correspond to the RRM-RS based measurement described above, CRS-based RRM measurement, or both of the RRM-RS based measurement and CRS-based RRM measurement.

For example, it may be defined so that a target cell currently transmitting the message 3 reports all of the RRM-RS configurations and the RRM measurements about all of the ports. The definition above provides an advantage that the corresponding cell may effectively configure the CSI-RS by using the reported information when appropriate CSI-RS configurations are applied to the UE.

Also, instead of reporting all of the RRM-RS measurements, it may be defined so that the RRM-RS measurements within Z dB with respect to the best RRM-RS measurement may be reported.

At this time, the threshold z may be fixed in advance, or the eNB may inform the threshold z through the RAR message of the S1702 step. In this case, the information may be understood only by enhanced UEs.

Also, when the UE reports RRM-RS measurements as described above, the PCI of the cell transmitting the corresponding RRM-RS may be reported together as association information.

This operation is advantageous in that if the RRM measurement with respect to the RRM-RS transmitted from a neighbor cell in addition to a target cell exhibits a value higher than a predetermined level (for example, within a threshold Z'), degree of interference from neighboring cells on the corresponding UE may be figured out beforehand. And the information about the degree of interference may be utilized as a reference for CSI process-related configuration.

As described above, the time point at which the UE reports the RRM-RS based RRM measurements and/or CRS-based RRM measurements to the eNB may not correspond to the step for transmitting the message 3 (namely S1703 step) but correspond to a different step. In this case, the UE may transmit the message 3 by including an indicator (for example, 1-bit indicator) for informing the eNB that the UE reports the RRM-RS based RRM measurements and/or CRS-based RRM measurements in the subsequent steps in the message 3.

For example, in the conventional operation, after the UE receives message 4 from the eNB (when the eNB confirms contention resolution as the message 4 includes an identifier of the UE), the UE is made to transmit a positive acknowledgement (namely 'ACK') to the eNB. Being associated with the time point, a transmission time point may be defined to report the RRM-RS based RRM measurements and CRS-based RRM measurements to the eNB.

In other words, if the time point at which ACK is transmitted is subframe (SF) #n, it may be defined that the UE transmits the RRM-RS based RRM measurements and CRS-based RRM measurements to the same SF #n (for example, by the PUSCH).

Also, in case a specific SF offset k is predefined or informed through a preceding message of the eNB (for example, system information or message 2), it may be defined in advance or configured for the UE that by applying the corresponding k value, the RRM-RS based RRM measurements and CRS-based RRM measurements are transmitted at the SF #n+k time point.

Also, transmission may be defined for the corresponding time point according to explicit triggering (for example, UL grant) from the eNB. In other words, in this case, after all of the RACH procedure are completed, a specific UL grant may be received from the eNB (for example, a specifically defined signaling form may be used, the form including an explicit or implicit field indicator in the corresponding UL grant or the corresponding UL grant may be masked with a separate RNTI. In this way, at the time point of receiving (namely in response to the UL grant) a specific UL grant commanding the RRM-RS based RRM measurements and CRS-based RRM measurements to be transmitted to the eNB, the information may be defined to be transmitted to the eNB, or the information may be configured for the UE.

Step 4 (Reception of Contention Resolution Message)

The eNB may transmit a contention resolution message (namely message 4). For this step, methods according to illustration of FIG. 8 may be used directly.

Also, according to another one embodiment of the present invention, simultaneously with this step, namely within the contention resolution message (namely message 4), the eNB may immediately provide the corresponding UE with transport mode configuration and CSI feedback-related configuration information by taking into account the RRM-RS based RRM report information at the message 3 step.

Through the process above, according to the present invention, for normal transmission mode setting, CSI feedback and transmission/reception operation, the UE may quickly enter the normal operation state quickly without using additional handover or cell re-selection process.

The present invention has been described mostly with respect to the FD-MIMO use case for the convenience of description; however, as described above, the present invention may also be used for various use cases including a plurality of RRM-RS configurations in an amorphous cell environment (namely as an amorphous cell is composed by a different number of TP(s), the different number of TP(s) transmit the respective RRM-RSs together). Besides, rather than a conventional method considering a target cell for initial access based on a single CRS-based RRM measurement for each cell, the present invention may be applied to other various environments in which initial access is performed by using the RRM measurement from separate other RSs (in the previous description, they have been called RRM-RSs for the purpose of convenience).

In the previous case 1 to 4, it was assumed that the UE performs initial access to a network for the convenience of description. However, the case 1 to 4 do not necessarily have to be applied sequentially only to the UE's initial access process, but each method may be performed independently.

The method in case 2 does not insist that the UE is confined to the system information received from the eNB before initial access to a network, but the RRM-RS configuration information may be provided to the UE through whichever system information broadcast from the eNB.

Also, the method in case 3 does not insist that the UE is confined to cell selection before performing the initial access to the network, but the method may be applied to whichever situation to select the best cell in which a cell on which the UE camps is (re)selected or handover is performed.

Also, the method in case 4 does not insist that the UE is confined to the RACH procedure used for initial access to the network, but the method may be applied to whichever RACH procedure performed by the UE. Also, the method in case 4 may be applied to for legacy UEs to transmit the CRS-based RRM measurement to the eNB.

Advanced RLM Operation

The UE has to perform the RRM for the purpose of measurement/report/management of a radio link status and received signal quality but also a radio link monitoring (RLM) operation.

More specifically in the case of RLM, the UE may compare radio link quality (for example, SNR (Signal-to-Noise Ratio) or SINR (Signal-to-Interference plus Noise Ratio)) with a specific threshold (namely Q_out and Q_in) and based on the comparison result, monitor/evaluate the radio link state (for example, out-of sync state or in-sync state) at a specific time point (for example, subframe) measured based on a reference signal (for example, CRS) with respect to a given time interval/period (for example, specific radio frame/subframe).

In what follows, in the description of the present invention, the conventional or generic RLM operations are called collectively "first RLM behaviors" for the purpose of convenience.

As an example of UE operation, according to the first RLM behavior, the UE performs an RLM operation including measuring (CRS based) downlink quality of a cell to which the UE is connected and comparing the measurement with the threshold Q_out and Q_in. If the corresponding downlink radio link is determined as being difficult to be "reliably received" (for example, in case radio link quality is worse than the threshold Q_out according to the behaviors specified in the 3GPP TS 36. 133 or in case the radio link quality is worse than the threshold Q_out as often as a predetermined number of times), the UE activates a timer for determining a radio link failure (RLF) by using the operation related to a specific "RLF (Radio Link Failure) timer". And if the corresponding timer expires, the UE initializes a link to a target cell and performs cell (re)selection process like searching for a new cell. If the Q_in related condition is met again before the RLF timer expires (namely in case radio link quality is better than the threshold Q_in or in case the radio link quality is better than the threshold Q_in as often as a predetermined number of times), the UE may maintain the link to the corresponding cell. In this case, the UE may stop the RLF timer.

Considering a situation in which such operation is applied directly to the FD-MIMO use case, even if the UE is made to determine an RLF as radio link quality becomes significantly low with respect to a specific cell according to the conventional (CRS-based) RLM behavior, it may be preferable to maintain the corresponding link if radio link quality of the PDSCH and/or EPDCCH transmission applying FD-MIMO beamforming to the corresponding UE still reveals reliable quality.

In other words, through the operation above, a communication link disconnection phenomenon may be reduced; for example, a performance gain may be expected by keeping the operation of receiving a control channel from an FD-MIMO beamformed EPDCCH and receiving a data channel from an FD-MIMO beamformed PDSCH. This is possible because a considerably high FD-MIMO beamforming gain may be obtained by utilizing a large number of antenna elements at the eNB side at the time of FD-MIMO transmission.

In what follows, to enable such an operation, the present invention proposes a method for replacing the "first RLM behavior" or defining a specific "second RLM behavior", which includes at least one of the following elements in addition to the "first RLM behavior" or setting the specific "second RLM behavior" for the UE.

(1) "The second RLM behavior" performs the RLM operation based on a separate, specific reference signal (RS) instead of using the CRS which bases the "first RLM behavior".

An example of the aforementioned RS may include at least one of the following RSs.

A specific CSI-RS (for example, the CSI-RS corresponding to the lowest or highest CSI-RS index set to the UE) may be used. Here, the CSI-RS may be a precoded CSI-RS.

Also, DRS-CSI-RS (namely the CSI-RS used as a discovery reference signal (DRS)) may be used. At this time, a physical cell identifier (PCI or PCID) may be the ID of a cell that is a target of the conventional "first RLM behavior". In other words, the UE performs the first RLM behavior with respect to the corresponding cell based on the CRS generated by using the corresponding PCI and/or performs the second RLM behavior with respect to a specific DRS-CSI-RS linked to (or associated with) the corresponding PCI. Here, the DRS-CSI-RS may be a precoded DRS-CSI-RS.

Also, the aforementioned separate RRM-RS may be used. For example, such an RRM-RS may correspond to the RRM-RS set separately so that it may be included in a signaling message related to the system information such as SIB as described above and applied when the UE performs initial access and/or cell (re)selection related operation in the idle mode. As another example, as described above, the RRM-RS may correspond to an RS transmitted in a locally different direction through a sharp beam, such as the one used in the FD-MIMO operation or correspond to an RS transmitted from an amorphous cell comprising a different number of cells or TPs (Transmission Points).

(2) Related to the "second RLM behavior", separate determination conditions independent of a condition for RLF determination (for example, the condition includes transmission parameters (see Table 6 and 7), threshold for out-of-sync/in-sync determination and/or RLF timer) applied to the first RLM behavior may be defined or set to the UE (for example, through RRC signaling).

For example, the DCI format about the second RLM behavior is a specific DCI formation independent of the DCI 1A (see Table 6) and DCI 1C (see Table 7) in the first RLM behavior; and may newly define the out-of-sync and in-sync condition or may be configured to the UE.

In other words, the UE estimates (or measures) radio link quality when the DCI format predefined with respect to the second RLM behavior or configured to the UE is received from the eNB and determines the out-of-sync/in-sync state by comparing the estimated (or measured) result with a threshold (in other words, Q'_out and Q'_in)

Also, it may be defined that the UE assumes that the corresponding DCI (for example, about out-of-sync or in-sync state) defined/set with respect to the second RLM behavior is transmitted from a specific EPDCCH set (for example, the lowest or highest EPDCCH set) or the DCI may be configured to the UE. This is intended to consider the fact that the DCI transmitted from the corresponding specific EPDCCH set is transmitted by FD-MIMO beamforming (namely FD-MIMO beamforming is applied).

For at least one of the elements such as "Number of control OFDM symbols", "CCE or ECCE", and "ratio of EPDCCH RE energy to average RS RE energy", separate values may be defined in advance independently (so that at least one element may be calculated based on the corresponding EPDCCH) from the transmission parameter applied to the first RLM behavior with respect to the out-of-sync and in-sync, respectively or set to the UE.

At this time, for example, the number of control OFDM symbols and (E)CCE merge level applied to the second RLM behavior may be set differently according to the cell (or carrier) bandwidth. Also, the ratio of (E)PDCCH RE energy to average RS RE energy may be set differently from the number of antenna ports to which the RS described in (1) above is transmitted.

Separately from the first RLM behavior, a threshold used for an RLF-related determination condition in the second RLF behavior may be defined independently or set to the UE. In the present invention, the threshold is denoted as Q'_in and Q'_out for the convenience of description.

The threshold Q'_out is defined as a level at which a downlink radio link is not received reliably and may correspond to X % of block error rate (BER) of hypothetical (E)PDCCH transmission (namely, according to the EPDCCH set (for example, the lowest EPDCCH set) and a predefined related criterion).

The threshold Q'_in is defined as a level at which a downlink radio link quality is received reliably more significantly than the downlink radio link quality at the Q'_out and may correspond to Y % of BER of hypothetical (E)PDCCH transmission (namely, according to the EPDCCH set (for example, the lowest EPDCCH set) and a predefined related criterion).

(3) The "second RLM behavior" described in (1) and/or (2) may be designated/set to replace the "first RLM behavior" according to the indication/setting by a specific upper layer signal (for example, RRC signaling) or to perform separately according to an independent condition.

Here, the "second RLM behavior" may always be activated for a UE capable of a specific FD-MIMO operation (or more specifically, the UE supporting the second RLM behavior according to the present invention). In other words, a UE capable of a specific FD-MIMO operation may always perform the second RLM behavior.

Also, the "second RLM behavior" is not always activated even for a UE capable of a specific FD-MIMO operation (more generally a UE supporting the second RLM behavior according to the present invention); rather, the "second RLM behavior" may be activated in case the FD-MIMO related mode (more generally the mode supporting the second RLM behavior according to the present invention) is configured for the corresponding UE. In case, even for the UE capable of a specific FD-MIMO operation, the second RLM behavior is not always performed; the second RLM behavior may be performed when the FD-MIMO related operation is activated (namely FD-MIMO related mode setting).

In this case, the second RLM behavior is defined or configured for the UE to replace the first RLM behavior, or the first and the second RLM behaviors are defined or configured for the UE to be performed together.

As described in the latter case, if the first and the second RLM behavior operate together, the second RLM behavior may always operate independently of the first RLM behavior due to a separate operating condition. Similarly, in case the second RLM behavior is dependent on the first RLM behavior, and a specific condition is met by the first RLM behavior, the operating condition of the second RLM behavior may be defined dependent thereon or configured for the UE. For example, the second RLM behavior may be performed being dependent on the first RLM behavior as in the embodiment of (4) described later.

The UE capable of FD-MIMO operation may transmit its specific capability signaling (namely capability of supporting FD-MIMO operation) to the eNB when initially connecting to a network. At this time, a specific FD-MIMO related capability signaling format may be defined. For example, the second RLM behavior may be applied to the UE capable of FD-MIMO operation (for example, the UE signaling capability of supporting FD-MIMO operation).

Also, the specific capability signaling may be subdivided in the form of capability signaling related to applicability of the second RLM behavior. In other words, a specific FD-MIMO related capability message may include information indicating applicability of the second RLM behavior.

Also, the RRM-RS and/or related initial access operation method may also be subdivided similarly in the form of specific capability signaling. In other words, the UE may transmit to the eNB capability signaling about capability about whether the RRM-RS is supported and/or whether the initial access operation method related to the capability signaling is supported.

If the second RLM behavior is defined or configured for the UE in the form of replacing the first RLM behavior, determination of RLF by the UE is determined solely according to the determination condition for the second RLM behavior. In other words, the UE may determine the RLF only from the determination condition about the second RLM behavior described previously with respect to (2).

Also if the second RLM behavior is defined or configured for the UE such that the second RLM behavior is performed together with the first RLM behavior and both of them are kept to be activated, the UE's determination of RLF takes into account the determination conditions related to both of the first and the second RLM behaviors, and determination conditions are defined or configured for the UE so that the second RLM behavior and a communication link of the corresponding cell is broken (namely a link to the corresponding cell is initialized) only when both cases make RLF decisions.

Also, determination conditions may be defined or configured for the UE so that if either of the first and the second RLM behavior makes an RLF decision, the communication link of the corresponding cell may be broken (namely a link to the corresponding cell is initialized). And/or the determination condition may be made so that if the second (or first) RLM behavior makes an RLF decision, RLF decision is made irrespective of the determination result of the first (or the second) RLM behavior. In other words, one of the first and the second RLM behavior has a priority higher than that of the other in making an RLF decision.

(4) As described above, the second RLM behavior may be performed being dependent on the first RLM behavior.

As one example, after a specific offset time, d1 is passed from since the time t1 the RLF timer is started by the "first RLM behavior" (for example, d1=0 or d1 is a specific positive number), an RLF decision-related operation due to the "second RLM behavior" may be initiated with respect to the specific RS described in the case (1).

Also, if a specific $Q'\_in$ condition is satisfied due to the second RLM behavior before the RLF timer is completed since the start of the RLF timer due to the first RLM behavior (namely in case the radio link quality is better than $Q'\_in$), the RLF decision may not be made for the corresponding cell.

Considering the proposed operation, the "second RLM behavior" is made to be activated only for a specific time period linked to the time at which the RLF timer of the "first RLM behavior" is operated, thereby preventing unnecessary battery consumption of the UE.

Also, during a period for which the UE (re)selects a new cell and completes a (re)connection normally (or until the (re)connection is completed and the corresponding new cell becomes ready to initiate the "first RLM behavior" normally), the UE has to be defined or set up so that the UE may receive only the control signaling through DCIs from a specific EPDCCH set associated with the corresponding "second RLM behavior" (for example, the lowest EPDCCH set). And an operation of receiving a specific PDSCH through the EPDCCH and uplink transmission may be commanded.

Also, during a period for which the UE (re)selects a new cell and completes a (re)connection normally (or until the (re)connection is completed and the corresponding new cell becomes ready to initiate the "first RLM behavior" normally), the UE may be limited to receive only the DCI masked with a specific RNTI(s) such as C-RNTI or SPS C-RNTI from the corresponding EPDCCH set. In this case, the UE only has to attempt blind detection of the DCIs in the limited form.

And/or if the UE is specifically defined under such a situation or according to an operating condition set to the UE, the UE may have to perform an operation related to a search for a new cell. In other words, while performing the operation related to a search for a new cell continuously, monitoring of specific EPDCCH DCI(s) through a specific EPDCCH set associated with the "second RLM behavior" has to be continued. Through this operation, connectivity of a communication link may be greatly improved by allowing the FD-MIMO beamformed PDSCH scheduled by the FD-MIMO beamformed EPDCCH to be performed continuously (even if the "first RLM behavior" has made an RLF decision).

As another example, the "second RLM behavior" may be initiated according to the RLF decision result due to the "first RLM behavior".

For example, by taking into account both the determination conditions due to the "first RLM behavior" and the "second RLM behavior", it is assumed that a communication link of the corresponding cell is broken (namely a link to the corresponding cell is initialized) only when both of the two cases make an RLF decision. In this case, only when the "first RLM behavior" determines an RLF (namely the case in which radio link quality is worse than a threshold $Q\_out$ and an activated RLF timer is expired), the "second RLM behavior" may be initiated. On the other hand, in case radio link quality is better than the threshold Q_in, the "second RLM behavior" may not be initiated even if an RLF timer due to the "first RLM behavior" has been activated.

As another example, it is assumed that if either of the "first RLM behavior" and the "second RLM behavior" makes an RLF decision, it is defined or configured for the UE that a communication link of the corresponding cell may be broken (namely a link to the corresponding cell is initialized). Also, it is the same that in case an RLF decision is made by the first RLM behavior, an RLF decision may be made irrespective of the determination result of the second RLM behavior. In this case, if an RLF decision is made due to the "first RLM behavior" (namely the case in which radio link quality is worse than a threshold Q_out and an activated RLF timer is expired), a communication link of the corresponding cell is broken (namely a link to the corresponding cell is initialized), and the "second RLM behavior" may not be initiated.

FIG. 18 illustrates radio link monitoring according to one embodiment of the present invention.

Referring to FIG. 18, the UE may perform radio link monitoring (in what follows, 'first RLM') on a cell based on a CRS (S1801).

The UE performs radio link monitoring (in what follow, 'second RLM') on a cell based on a specific reference signal (RS) other than the CRS (S1802).

Here, the specific RS may refer to the RS described in the case (1) excluding the CRS. For example, a (precoded) CSI-RS, (precoded) DRS-CSI-RS, an RRM-RS set separately to be applied when the UE performs initial access and/or the UE in the idle mode performs cell (re)selection-related operation, an RS transmitted in a locally different direction through a sharp beam such as the one in the FD-MIMO transmission, or an RS transmitted from an amorphous cell comprising a different number of cells or TPs (Transmission Points).

The UE determines an RLF of a cell based on a CRS-based first RLM and non-CRS based second RLM, or based on the non-CRS based second RLM (S1803).

Here, in case an RLF for the corresponding cell is determined by using only the second RLM in the S1803 step, the S1801 step above may not be performed.

More specifically, the UE may monitor downlink radio link quality about the corresponding cell and compare a measurement due to monitoring with a predetermined threshold.

Here, in the case of the CRS-based first RLM, the UE may compare the measurement due to CRS-based monitoring with Q_in and Q_out.

Also, in the case of non-CRS based second RLM, the UE may compare measurements due to non-CRS based monitoring with Q'_in and Q'_out. At this time, as described above, Q'_in and Q'_out may be defined in advance independently of Q_in and Q_out or configured for the UE.

As described above, Q'_in and Q'_out may each correspond to the BER with respect to virtual (E)PDCCH transmission using a predefined transmission parameter (namely (E)PDCCH transmission parameter). In other words, virtual (E)PDCCH transmission indicates (E)PDCCH transmission which assumes transmission based on the (E)PDCCH transmission parameter. At this time, the (E)PDCCH transmission parameter may be defined independently of the transmission parameter for the aforementioned CRS-based first monitoring (namely PDCCH/PCFICH transmission parameter) or configured for the UE.

And the UE may activate an RLF timer based on a comparison result between a measurement due to monitoring and a predetermined threshold. And if an RLF timer expires, the UE may determine an RLF with respect to the cell.

For example, in the case of CRS-based first RLM, if radio link quality is worse than Q_out, the UE may be determined to be in the out-of-sync state; if radio link quality is better than Q_in, the UE may be determined to be in the in-sync state. At this time, if radio link quality is worse than Q_out (or if radio link quality is determined to be worse than a threshold Q_out as often as a predetermined number of times), the UE may activate an RLF timer with respect to the first RLM. And if the RLF timer with respect to the first RLM expires, the UE may determine an RLF with respect to the cell. At this time, if radio link quality is better than Q_in during operation of an RLF timer with respect to the first RLM (or if radio link quality is determined to be better than a threshold Q_in as often as a predetermined number of times), the UE may stop the RLF timer with respect to the first RLM.

Also, in the case of non-CRS based second RLM, if radio link quality is worse than Q'_out, the UE may be determined to be in the out-of-sync state; if radio link quality is better than Q'_in, the UE may be determined to be in the in-sync state. At this time, if radio link quality is worse than Q'_out (or if radio link quality is determined to be worse than a threshold Q'_out as often as a predetermined number of times), the UE may activate an RLF timer with respect to the second RLM. And if the RLF timer with respect to the second RLM expires, the UE may determine an RLF with respect to the cell. At this time, if radio link quality is better than Q'_in during operation of an RLF timer with respect to the second RLM (or if radio link quality is determined to be better than a threshold Q'_in as often as a predetermined number of times), the UE may stop the RLF timer with respect to the second RLM.

As described in detail above, the UE may perform the second RLM behavior by replacing the first RLM behavior but may perform the second RLM behavior together with the first RLM behavior.

In other words, if performing the second RLM behavior by replacing the first RLM behavior, the UE may determine an RLF with respect to the corresponding cell due to the second RLM behavior.

Meanwhile, if performing the second RLM behavior together with the first RLM behavior, the UE may perform the second RLM behavior independently of the first RLM behavior, but in case a specific condition is satisfied due to the first RLM behavior, the UE may perform the second RLM behavior.

For example, the second RLM may be performed after a specific time offset from since the RLF timer due to the first RLM has been started. Or if the corresponding cell due to the first RLM is determined to be an RLF, the second RLM may be performed.

In this way, if the second RLM behavior is performed together with the first RLM behavior, and both the first and the second RLM behavior determine an RLF with respect to the corresponding cell, the UE may finally determine an RLF with respect to the corresponding cell.

Similarly, if the second RLM behavior is performed together with the first RLM behavior, and the first RLM behavior or the second RLM behavior determines an RLF with respect to the corresponding cell, the UE may finally determine an RLF with respect to the corresponding cell. At this time, if an RLF is determined by any one of the first and the second RLM behavior, an RLF is finally determined with respect to the corresponding cell irrespective of a determination result with respect to the other operation.

As described above, if an RLF is finally determined with respect to the corresponding cell due to the first and/or second RLM, the UE initializes a link to the corresponding cell and performs cell (re)selection process of searching for a new cell.

The present invention has been described mostly with respect to the FD-MIMO use case for the convenience of description; however, as described above, the present invention may also be used for various use cases including a plurality of RRM-RS configurations in an amorphous cell environment (each RRM-RS is transmitted together with a different number of TPs/cells). In other words, different from the conventional "first RLM behavior", separate "second RLM behavior" may be defined or configured for the UE according to various forms of operation/condition proposed by the present invention; accordingly, it is apparent that the present invention may be extended being generalized so that the RLF determination condition may be applied differently. This kind of use case may be defined in various ways, and the methods according to the present invention are not limited to a specific use case.

Also, in the present invention, an expression such as "initial access related operation" or "at the time of initial access" has been introduced for the convenience of description, and it should be understood that the method according to the present invention may be generally applied to the case in which a UE in the idle state (for example, a state rather than the RRC-connected state) performs cell selection/reselection. In other words, in addition to the state in which the UE is initially turned on and performs cell selection, since when the UE stays in the idle state due to various causes such as call drop even after the UE is connected to a specific cell or a break period, the UE has to continuously search for the best cell and connect to other cell if needed, the present invention may also be generally applied to the operation described above.

As a specific example, suppose the UE in the idle state attempts to connect to a specific cell. A method according to the present invention first obtains system information of a specific cell exhibiting the strongest average reception power by using the conventional CRS. If neighboring cells provide RS-related information of the same intended use as the RRM-RS, the UE (in the idle state) measures the RRM-RS of the neighboring cells together. If the neighboring cell (in view of the "FD-MIMO" operation) is the best cell, cell-reselection is immediately performed on the corresponding neighboring cell (while the UE is in the idle state) and connects to the corresponding neighboring cell.

General Apparatus to which the Present Invention May be Applied

FIG. 19 illustrates a block diagram of a wireless communication apparatus according to an embodiment of the present invention.

Referring to FIG. 19, the wireless communication system includes a base station (eNB) 1910 and a plurality of user equipments (UEs) 1920 located within the region of the eNB 1910.

The eNB 1910 includes a processor 1911, a memory 1912 and a radio frequency unit 1913. The processor 1911 implements the functions, processes and/or methods proposed in FIGS. 1 to 18 above. The layers of wireless interface protocol may be implemented by the processor 1911. The memory 1912 is connected to the processor 1911, and stores various types of information for driving the processor 1911.

The RF unit 1913 is connected to the processor 1911, and transmits and/or receives radio signals.

The UE 1920 includes a processor 1921, a memory 1922 and a radio frequency unit 1923. The processor 1921 implements the functions, processes and/or methods proposed in FIGS. 1 to 18 above. The layers of wireless interface protocol may be implemented by the processor 1921. The memory 1922 is connected to the processor 1921, and stores various types of information for driving the processor 1921. The RF unit 1923 is connected to the processor 1921, and transmits and/or receives radio signals.

The memories 1912 and 1922 may be located interior or exterior of the processors 1911 and 1921, and may be connected to the processors 1911 and 1921 with well known means. In addition, the eNB 1910 and/or the UE 1920 may have a single antenna or to multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

This document discloses a method for a UE to perform radio link monitoring in a wireless communication system with examples based on the 3GPP LTE/LTE-A system; however, the present invention can be applied to various other types of wireless communication systems in addition to the 3GPP LTE/LTE-A system.

The invention claimed is:

1. A method for performing, by a user equipment (UE), radio link monitoring in a wireless communication system, the method comprising:
receiving, from a base station, (i) information related to the radio link monitoring for a radio link quality of a cell and (ii) information related to the radio link monitoring for a radio link of a serving cell beam,
wherein the information related to the radio link monitoring for the radio link of the serving cell beam includes configuration information related to a reference signal (RS) based on a type of the radio link monitoring performed by the UE; the configuration information including a specific parameter, wherein:
based on the specific parameter representing the radio link monitoring on the radio link quality of the serving cell beam, the method further comprises:
estimating, based on the RS, the radio link quality of the serving cell beam;
comparing, based on the information related to the radio link monitoring for the radio link quality of the serving cell beam, the estimated radio link quality of the serving cell beam with a determination condition for determining a failure of the serving cell beam; and
performing a procedure for a beam reselection based on (i) the failure of the serving cell beam being detected and (ii) a timer related to the failure of the serving cell beam, and
based on the specific parameter representing the radio link monitoring on the radio link quality of a cell, the method further comprises:
estimating, based on the RS, the radio link quality of the cell;
comparing, based on the information related to the radio link monitoring for the radio link quality of the cell, the estimated radio link quality of the cell with a determination condition for determining a failure of a radio link of the cell; and
performing a radio resource control (RRC) connection re-establishment procedure based on (i) the failure of the radio link of the cell being detected and (ii) a timer related to the failure of the radio link of the cell, and
based on the specific parameter representing both (i) the radio link monitoring on the radio link quality of the serving cell beam and (ii) the radio link monitoring on the radio link quality of the cell, the method further comprises:
estimating, based on the RS, (i) the radio link quality of the serving cell beam and (ii) the radio link quality of the cell;
comparing, based on (i) the information related to the radio link monitoring for the radio link quality of the serving cell beam and (ii) the information related to the radio link monitoring for the radio link quality of the cell, (i) the estimated radio link quality of the serving cell beam with the determination condition for determining the failure of the serving cell beam and (ii) the estimated radio link quality of the cell with the determination condition for determining the failure of a radio link of the cell; and
performing (i) the procedure for the beam reselection based on (a) the failure of the serving cell beam being detected and (b) the timer related to the failure of the serving cell beam and (ii) the RRC connection re-establishment procedure based on (a) the failure of the radio link of the cell being detected and (b) the timer related to the failure of the radio link of the cell, and
wherein (i) the determination condition for determining the failure of the serving cell beam and (ii) the determination condition for determining the failure of a radio link of the cell are set separately.

2. The method of claim 1, further comprising:
receiving, from the base station, control information or data through the serving cell beam based on the radio link quality of the serving cell beam measured by the RS satisfies a pre-configured threshold condition determined based on the determination condition for determining the failure of the serving cell beam.

3. The method of claim 2, wherein the control information is masked with a Cell Radio Network Temporary Identifier (C-RNTI).

4. The method of claim 2, wherein the RS is a Channel State Information-Reference Signal (CSI-RS).

5. The method of claim 2, wherein the control information is received at a predetermined control channel set, and
wherein the predetermined control channel set is configured for the radio link monitoring on the serving cell beam, among one or more control channel sets.

6. The method of claim 1, wherein the specific parameter includes at least one of a first value, a second value, or a third value,
wherein the first value is for performing the radio link monitoring on the radio link quality of the serving cell beam,
wherein the second value is for performing the radio link monitoring on the radio link quality of the cell, and
wherein the third value is for performing both the radio link monitoring on the radio link quality of the serving cell beam and the radio link monitoring.

7. The method of claim 6, wherein the radio link monitoring on the radio link quality of the serving cell beam is performed together with the radio link monitoring on the radio link quality of the cell, based on the specific parameter representing the third value.

8. The method of claim 1, wherein the RRC connection with the cell is re-established regardless of the failure of the serving cell beam.

9. The method of claim 1, the radio link monitoring on the radio link quality of the serving cell beam is performed after a specific time offset from a timing at which a timer, which is related to the radio link monitoring on the radio link quality of the cell, for determining the failure of the radio link of the cell is operated.

10. A user equipment (UE) for performing radio link monitoring in a wireless communication system, comprising:
a Radio Frequency (RF) antenna for transmitting and receiving a radio signal; and
a processor for controlling the RF antenna,
wherein the processor is configured to:
receive, from a base station, (i) information related to the radio link monitoring for a radio link quality of a cell and (ii) information related to the radio link monitoring for a radio link of a serving cell beam,
wherein the information related to the radio link monitoring for the radio link of the serving cell beam includes configuration information related to a reference signal (RS) based on a type of the radio link monitoring performed by the UE; the configuration information including a specific parameter, wherein:

based on the specific parameter representing the radio link monitoring on the radio link quality of the serving cell beam, the method further comprises:
  estimate, based on the RS, the radio link quality of the serving cell beam;
  compare, based on the information related to the radio link monitoring for the radio link quality of the serving cell beam, the estimated radio link quality of the serving cell beam with a determination condition for determining a failure of the serving cell beam; and
  perform a procedure for a beam reselection based on (i) the failure of the serving cell beam being detected and (ii) a timer related to the failure of the serving cell beam, based on the specific parameter representing the radio link monitoring on the radio link quality of the cell, the method further comprises:
  estimate, based on the RS, the radio link quality of the cell;
  compare, based on the information related to the radio link monitoring for the radio link quality of the cell, the estimated radio link quality of the cell with a determination condition for determining a failure of a radio link of the cell; and
  perform a radio resource control (RRC) connection re-establishment procedure based on (i) the failure of the radio link of the cell being detected and (ii) a timer related to the failure of the radio link of the cell, and based on the specific parameter representing both (i) the radio link monitoring on the radio link quality of the serving cell beam and (ii) the radio link monitoring on the radio link quality of the cell, the method further comprises:
  estimate, based on the RS, (i) the radio link quality of the serving cell beam and (ii) the radio link quality of the cell;
  compare, based on (i) the information related to the radio link monitoring for the radio link quality of the serving cell beam and (ii) the information related to the radio link monitoring for the radio link quality of the cell, (i) the estimated radio link quality of the serving cell beam with the determination condition for determining the failure of the serving cell beam and (ii) the estimated radio link quality of the cell with the determination condition for determining the failure of a radio link of the cell; and
  perform (i) the procedure for the beam reselection based on (a) the failure of the serving cell beam being detected and (b) the timer related to the failure of the serving cell beam and (ii) the RRC connection re-establishment procedure based on (a) the failure of the radio link of the cell being detected and (b) the timer related to the failure of the radio link of the cell, and wherein (i) the determination condition for determining the failure of the serving cell beam and (ii) the determination condition for determining the failure of a radio link of the cell are set separately.

11. The UE of claim 10, wherein the RS is a Channel State Information-Reference Signal (CSI-RS).

12. The UE of claim 10, wherein based on the radio link quality of the serving cell beam measured by the RS satisfies a pre-configured threshold condition determined based on the determination condition for determining the failure of the serving cell beam, the processor is further configured to:
  receive, from the base station, control information or data through the serving cell beam.

13. The UE of claim 12, wherein the control information is received at a predetermined control channel set, and
  wherein the predetermined control channel set is configured for the radio link monitoring on the radio link quality of the serving cell beam, among one or more control channel sets.

14. The UE of claim 10, wherein the specific parameter includes at least one of a first value, a second value, or a third value,
  wherein the first value is for performing the radio link monitoring on the radio link quality of the serving cell beam,
  wherein the second value is for performing the radio link monitoring on the radio link quality of the serving cell beam,
  wherein the third value is for performing both the radio link monitoring on the radio link quality of the serving cell beam and the radio link monitoring on the radio link quality of the cell.

* * * * *